(12) United States Patent
Zourob et al.

(10) Patent No.: US 12,373,062 B2
(45) Date of Patent: Jul. 29, 2025

(54) METHOD AND APPARATUS FOR INTERFACING WITH A TOUCH SENSOR

(71) Applicant: Telefonaktiebolaget LM Ericsson (publ), Stockholm (SE)

(72) Inventors: Mohammed Zourob, London (CA); Alexander Hunt, Tygelsjö (SE); Andreas Kristensson, Södra Sandby (SE); Mohammed Abdulaziz, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/684,076

(22) PCT Filed: Aug. 31, 2021

(86) PCT No.: PCT/EP2021/074044
§ 371 (c)(1),
(2) Date: Feb. 15, 2024

(87) PCT Pub. No.: WO2023/030614
PCT Pub. Date: Mar. 9, 2023

(65) Prior Publication Data
US 2024/0393902 A1    Nov. 28, 2024

(51) Int. Cl.
G06F 3/041        (2006.01)
G06F 3/044        (2006.01)

(52) U.S. Cl.
CPC ...... *G06F 3/041661* (2019.05); *G06F 3/0446* (2019.05)

(58) Field of Classification Search
None
See application file for complete search history.

(56) References Cited

U.S. PATENT DOCUMENTS

| 8,022,317 B2 | 9/2011 | Ely |
| 2011/0175835 A1 | 7/2011 | Wang |

(Continued)

FOREIGN PATENT DOCUMENTS

| EP | 2372504 A2 | 10/2011 |
| KR | 101582597 B1 | 1/2016 |
| KR | 102081809 B1 | 2/2020 |

OTHER PUBLICATIONS

An, Jae-Sung , et al., "A 3.9-KHz Frame Rate and 61.0-dB SNR Analog Front-End IC With 6-bit Pressure and Tilt Angle Expressions of Active Stylus Using Multiple-Frequency Driving Method for Capacitive Touch Screen Panels", IEEE Journal of Solid-State Circuits, vol. 53, No. 1, Jan. 2018, 17 pages.

*Primary Examiner* — Nicholas J Lee
(74) *Attorney, Agent, or Firm* — Murphy, Bilak & Homiller, PLLC

(57) ABSTRACT

Methods (900, 1000) and apparatuses (40) disclosed herein embody a technique for reading a touch sensor (10) that provides several advantages, including scalability to touch sensors with high column/row counts and reductions in operating power. "Reading" in this context refers to the application of one or more excitation frequencies to one or more column lines (18) and row lines (28) used for detecting touch inputs to a touch surface (12) of the touch sensor (10), along with the corresponding transformation of the resulting sensing signals into frequency domain values and evaluation of the values (60, 68) corresponding to the excitation frequencies. The technique in an example implementation involves a hierarchical reading scheme that divides the touch surface (12), or any portion thereof, into regions, and performs initial touch detection at the per-region resolution, with subsequent higher-resolution reading of at least the region(s) where touch inputs have been detected.

25 Claims, 11 Drawing Sheets

(56) References Cited

U.S. PATENT DOCUMENTS

| | | |
|---|---|---|
| 2012/0075205 A1 | 3/2012 | Huang et al. |
| 2013/0176270 A1 | 7/2013 | Cattivelli et al. |
| 2015/0035768 A1 | 2/2015 | Shahparnia et al. |
| 2015/0091858 A1 | 4/2015 | Rosenberg et al. |
| 2015/0091859 A1 | 4/2015 | Rosenberg et al. |
| 2015/0309610 A1 | 10/2015 | Rabii et al. |
| 2016/0162011 A1 | 6/2016 | Verma et al. |
| 2016/0195990 A1 | 7/2016 | Han et al. |
| 2016/0259467 A1 | 9/2016 | Nayyar et al. |
| 2016/0378251 A1 | 12/2016 | Aznoe |
| 2017/0199022 A1 | 7/2017 | Anderson et al. |
| 2017/0199626 A1 | 7/2017 | D'Souza |
| 2017/0344174 A1 | 11/2017 | Pant et al. |
| 2018/0307376 A1 | 10/2018 | Citta |
| 2018/0329563 A1 | 11/2018 | Han et al. |
| 2019/0050102 A1 | 2/2019 | Johnson et al. |
| 2019/0138148 A1 | 5/2019 | Kwon |
| 2020/0050320 A1 | 2/2020 | Yang et al. |
| 2020/0326795 A1 | 10/2020 | Chang et al. |
| 2021/0191562 A1 | 6/2021 | Han |
| 2022/0075485 A1 | 3/2022 | Citta |

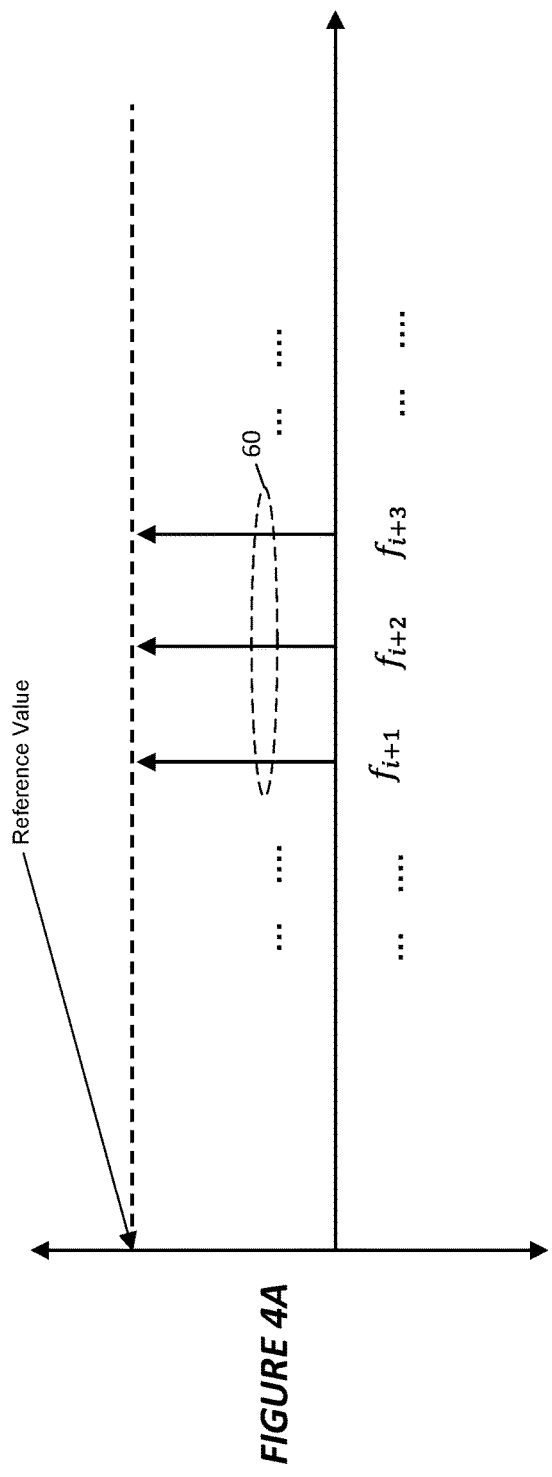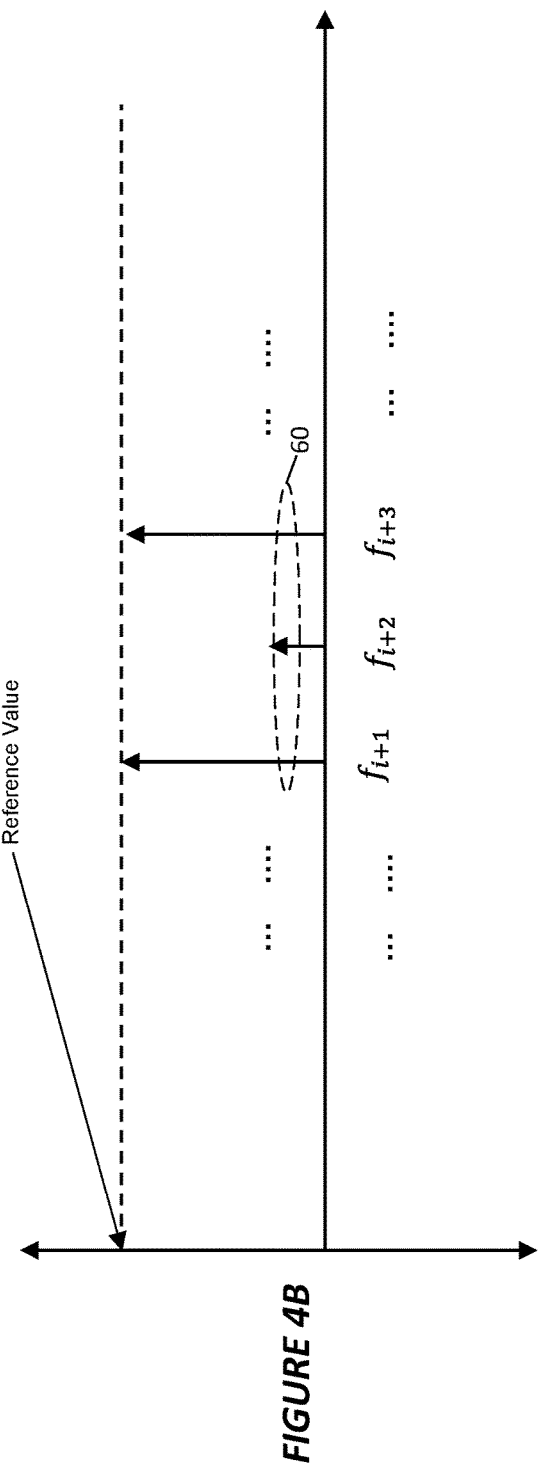

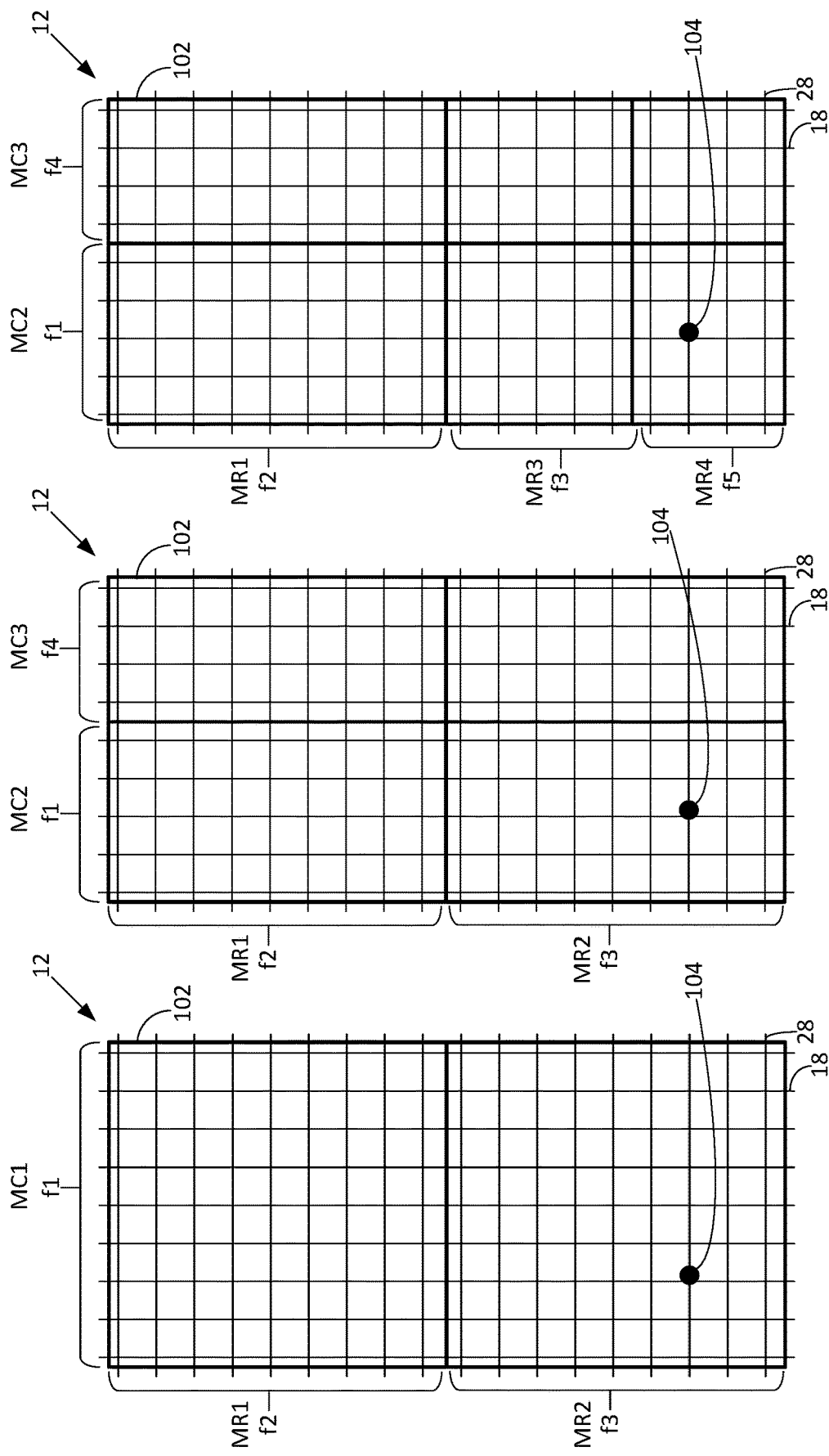

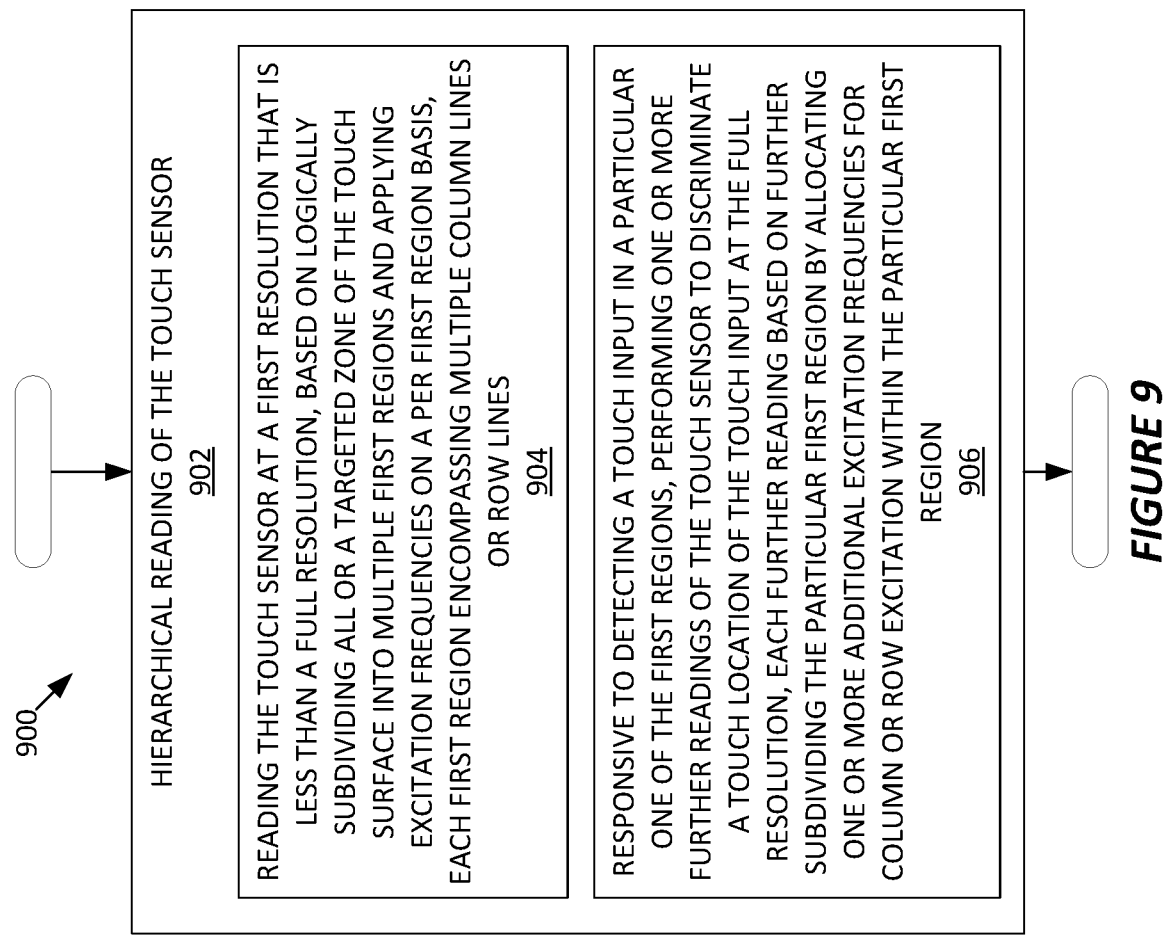
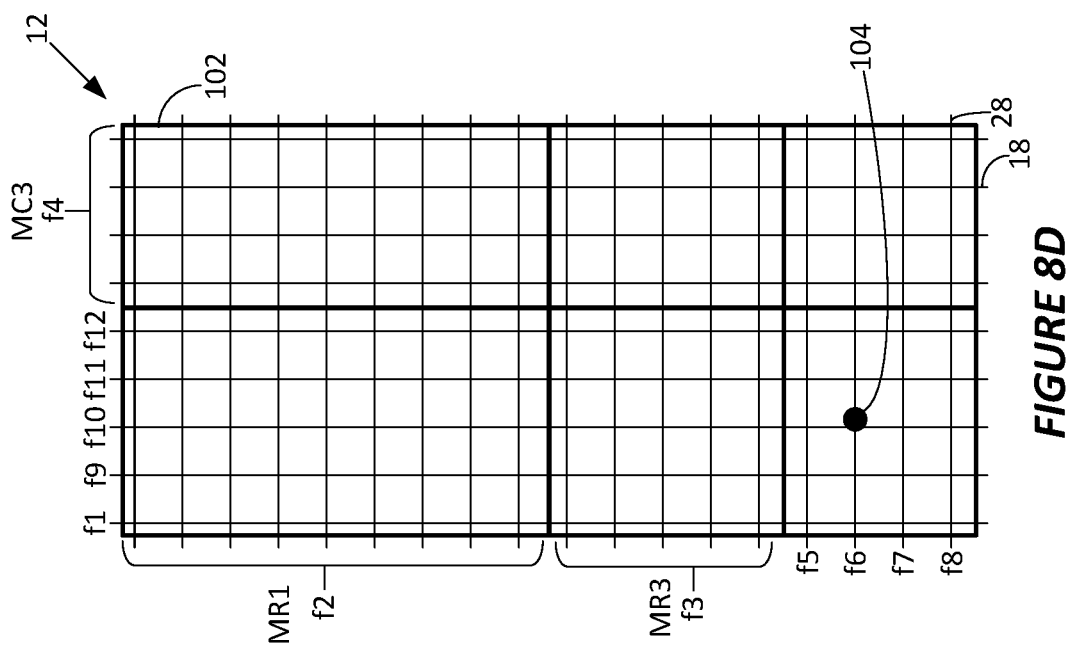
FIGURE 9
FIGURE 8D

METHOD AND APPARATUS FOR INTERFACING WITH A TOUCH SENSOR

TECHNICAL FIELD

The invention relates to touch sensors and particularly relates to interfacing with touch sensors.

BACKGROUND

Touch sensors find widespread use, in everything from laptops and other personal computing devices, such as smartphones and tablets, to banking terminals, point-of-sale terminals, etc. Interfacing with touch sensors imposes several challenges, such as balancing the amount and complexity of the interface circuitry against performance and cost. Among other things, "performance" refers to the time required for reading the touch sensor to determine whether or where the touch surface of the touch sensor is being touched, as well as the power consumption associated with detecting touch inputs.

An example arrangement involving capacitive touch sensor technology includes a capacitive touchscreen comprising a substrate with an X-Y grid of capacitors formed thereon or therein and arranged as intersecting screen columns and screen rows. A touch input to the touch surface alters the capacitance of the underlying or proximate capacitors, which alters the voltage of an analog excitation signal applied to the affected columns/rows. Reading touch sensors of the capacitive type, and of other types, may be accomplished by simultaneously applying excitation signals to the full set of screen columns using column-specific frequencies and doing likewise for the full set of rows, to obtain a combined column signal and a combined row signal which are digitized and transformed into the frequency domain for touch-input evaluation. See PCT/EP2020/086794, for example details regarding such operations.

SUMMARY

Methods and apparatus disclosed herein embody a technique for reading a touch sensor that provides several advantages, including scalability to touch sensors with high column/row counts and reductions in operating power. "Reading" in this context refers to the application of one or more excitation frequencies to one or more column lines and row lines used for detecting touch inputs to a touch surface of the touch sensor, along with the corresponding transformation of the resulting sensing signals into frequency domain values and evaluation of the values corresponding to the excitation frequencies. The technique in an example implementation involves a hierarchical reading scheme that divides the touch surface, or any portion thereof, into regions, and performs initial touch detection at the per-region resolution, with subsequent higher-resolution reading of at least the region(s) where touch inputs have been detected.

An example embodiment comprises a method of interfacing with a touch sensor having a grid of column lines and row lines for sensing touch inputs to a touch surface of the touch sensor. The method includes reading the touch sensor by exciting one or more column lines and row lines with one or more excitation frequencies to produce sensing signals that are frequency-domain transformed and evaluating transform values corresponding to the one or more excitation frequencies. Reading is performed hierarchically by reading the touch sensor at a first resolution that is less than a full resolution, based on logically subdividing all or a targeted zone of the touch surface into multiple first regions and applying excitation frequencies on a per first region basis, each first region involves multiple column lines or row lines. Responsive to detecting a touch input in a particular one of the first regions, hierarchical reading continues with performing one or more further readings of the touch sensor to discriminate a touch location of the touch input at the full resolution. Each further reading is based on further subdividing the particular first region by allocating one or more additional excitation frequencies for column or row excitation within the particular first region.

Another example embodiment comprises an apparatus configured for interfacing with a touch sensor having a grid of column lines and row lines for sensing touch inputs to a touch surface of the touch sensor. The apparatus includes reading circuitry, and processing circuitry operative to read the touch sensor via the reading circuitry, based on exciting one or more column lines and row lines with one or more excitation frequencies to produce sensing signals that are frequency-domain transformed and evaluate transform values corresponding to the one or more excitation frequencies. The reading is performed hierarchically based on the processing circuitry being configured to read the touch sensor at a first resolution that is less than a full resolution, based on logically subdividing all or a targeted zone of the touch surface into multiple first regions and applying excitation frequencies on a per first region basis, each first region involves multiple column lines or row lines. Responsive to detecting a touch input in a particular one of the first regions, the processing circuitry is configured to perform one or more further readings of the touch sensor to discriminate a touch location of the touch input at the full resolution. Each further reading is based on further subdividing the particular first region by allocating one or more additional excitation frequencies for column or row excitation within the particular first region.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 4A, 4B, 5A, and 5B are plots of example frequency-domain values evaluated by the apparatus of FIG. 3, for detecting touch inputs.

FIGS. 8A, 8B, 8C, and 8D are diagrams depicting another example use of varying frequency resolutions for performing a hierarchal read of a touch sensor.

FIG. 9 is a logic flow diagram of a method of hierarchically reading a touch sensor, according to an embodiment.

DETAILED DESCRIPTION

"Transform-based reading" of touch sensors is of particular interest herein. Transform-based reading refers to the use of frequency-domain transformations for detecting touch inputs to a touch sensor. Specifically, transform-based reading involves using analog frequency tones as the excitation signals to excite sensing lines arrayed on, in, or under a touch surface of the touch sensor, which results in the resulting sensing signals being corresponding frequency tones having an amplitude or other signal characteristic that depends on the presence or absence of touch inputs. Applying a frequency-domain transform to such sensing signals yields frequency-domain sensing values corresponding to the frequency tone(s) of the excitation signal(s) in use. A distinguishing feature of transform-based reading is that touch detection is based on obtaining and evaluating these frequency-domain sensing values.

One advantage of transform-based reading is that multiple simultaneously generated sensing signals can be combined and transformed together, to produce resulting frequency-domain sensing values in frequency bins or spectral positions corresponding to the frequency tones of the excitation signals. Consequently, the involved device or system need not generate and perform measurements on the sensing signals one at a time, such as would be required in more conventional "scanning" arrangements that use a multiplexed analog-to-digital converter to measure the voltage of each excitation signal.

Figure 1:
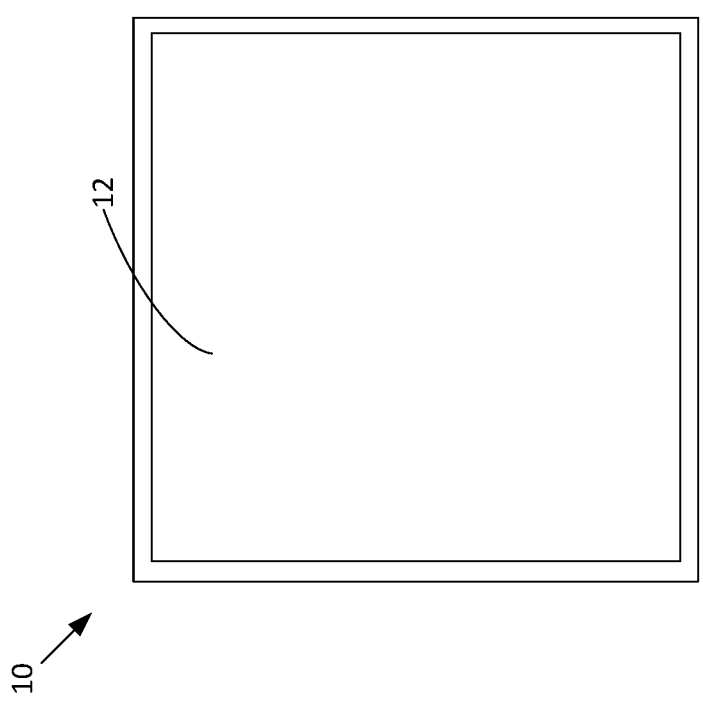

FIG. 1 illustrates a touch sensor 10 having a touch surface 12. In a non-limiting example, the touch sensor 10 comprises a touchscreen, such as may be controlled via software to display touch "controls" onscreen, for interacting with a software application. Sensing lines in, on, or under the touch surface 12 provide for detecting and locating touch inputs to the surface 12, e.g., according to X-Y coordinates associated with the touch surface 12.

Figure 2:
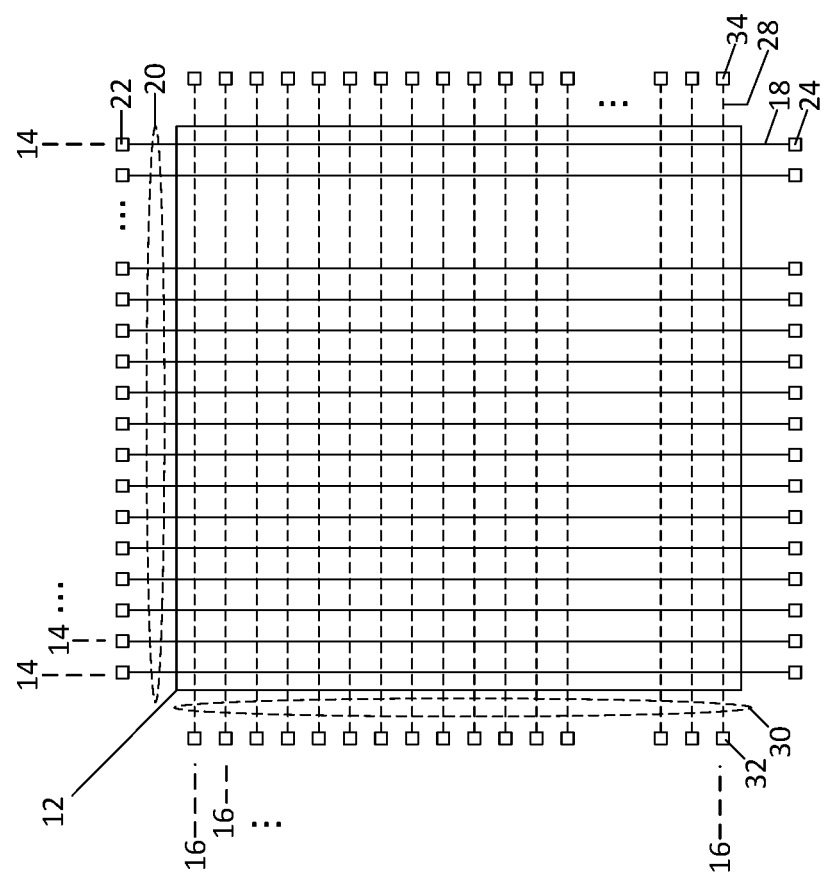
FIGS. 1 and 2 are block diagrams of an example touch sensor having a touch surface spanned by sensing lines.

FIG. 2 provides further example details of an example sensing-line arrangement, illustrating a division of the touch surface 12 according to columns 14 and rows 16. Column "lines" 18 define the respective columns 14, with a full set 20 of column lines 18 horizontally spanning the overall touch surface 12. Each column line 18 has respective ends 22 and 24. Similarly, row lines 28 define the respective rows 16, with a full set 30 of row lines 28 vertically spanning the overall touch surface 12. Each row line has respective ends 32 and 34.

Other geometric grids may be used, such as crisscrossing diagonal sensing lines, and such arrangements are considered to be interchangeable equivalents with column/row layouts discussed herein. Additionally, although the column lines 18 and the row lines 28 may not have an inherent polarity, in succeeding examples, the ends 22 and 32 are referred to as input ends and the ends 24 and 34 are referred to as output ends. These references make clear which end is driven by an excitation signal and which end provides the sensing signal used for sensing touch inputs. In practice, the ends may be interchangeable, and choosing which end is driven and which end is sensed may be arbitrary.

In one or more embodiments the touch sensor 10 is a capacitive touchscreen where the column lines 18 are capacitive lines, with each column line 18 having respective ends 22 and 24. The row lines 28 in such embodiments are capacitive lines, with each row line 28 having respective ends 32 and 34. In other embodiments, the touch sensor 10 uses a sensing technology other than capacitive sensing, such as optical sensing using multiple optical frequencies, or acoustic sensing using multiple acoustic frequencies. In other words, the sensing signals carried on or provided by the column lines 18 and row lines 28 depend on the underlying sensing technology.

In one or more example technologies, one or more signal characteristics of the sensing signal output by any given column line 18 or row line 28 vary in dependence on whether there is a touch input to the region of the touch surface 12 corresponding to the column line 18 or row line 28. For example, assume that an analog excitation signal having a frequency $f_1$ and a voltage $V_{ref}$ is applied to the input end 22 or 32 of a given column line 18 or row line 28, the corresponding output sensing signal will be an analog signal having a frequency $f_1$ and a voltage $V_{ref}$ (or something within a defined margin of $V_{ref}$) if there is no touch input anywhere along or proximate to the involved column line 18 or row line 28. However, the voltage of the output signal will be changed, e.g., reduced, if there is a touch input.

Figure 3:
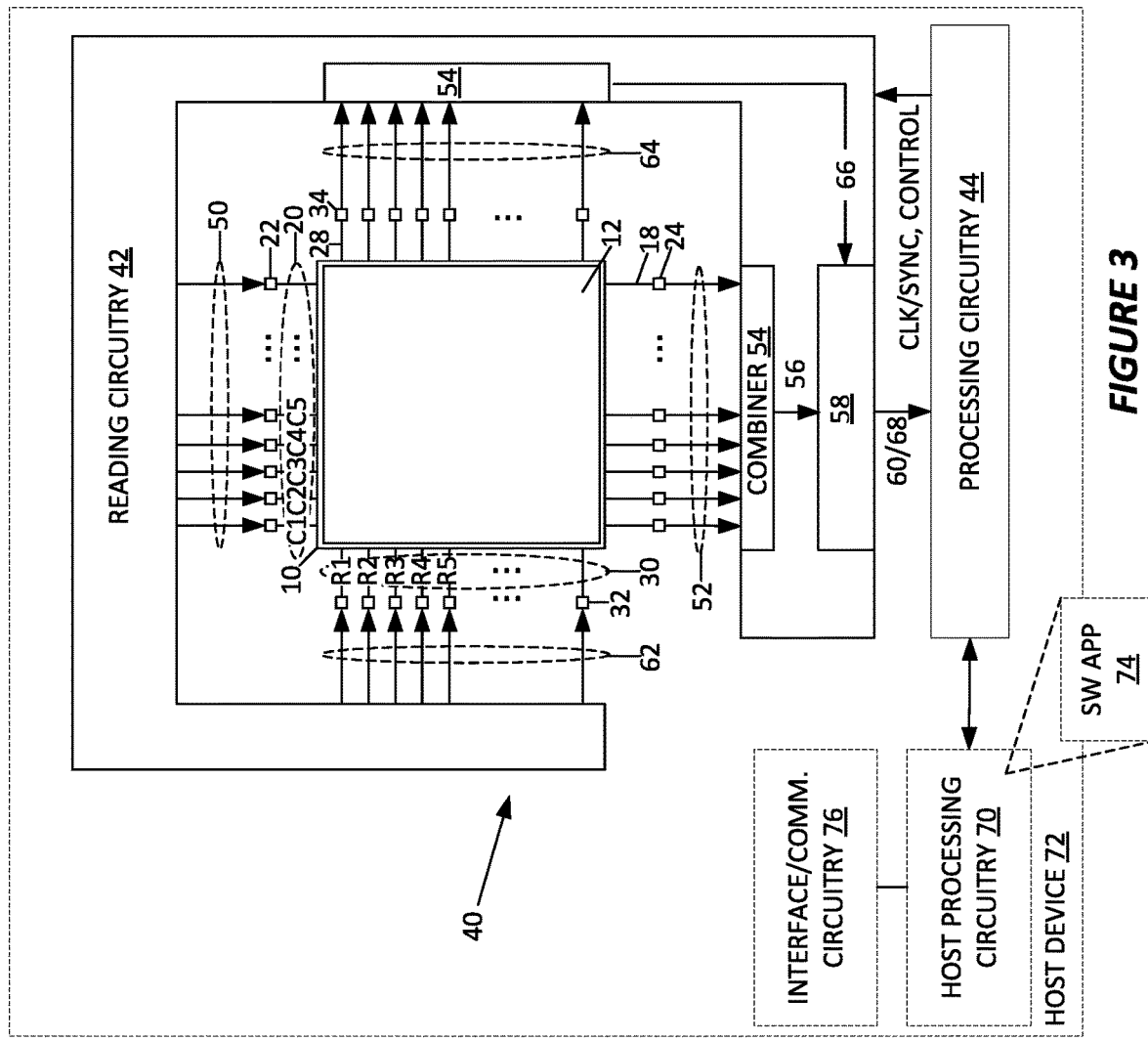
FIG. 3 is a block diagram of an apparatus configured for reading a touch sensor, according to one embodiment.

FIG. 3 illustrates an apparatus 40 according to one or more example embodiments. In at least one such embodiment, the apparatus 40 comprises one or more Integrated Circuits (ICs) that are configured to interface a host processor of an electronic device or system to a touchscreen that is used for providing input to one or more software applications executed by the host processor. Example IC implementations include a System-On-a-Chip (SoC) or a Multi-Chip Module (MCM).

The example apparatus 40 comprises reading circuitry 42 and processing circuitry 44 that is operatively associated with the reading circuitry 42. Performing a read of the touch sensor 10 comprises the processing circuitry 44 controlling the reading circuitry 42 to apply one or more column excitation signals 50 simultaneously to input ends 22 of one or more of the column lines 18, whereby corresponding column sensing signals 52 from output ends 24 of the excited column line(s) 18 are combined via a combiner 54 to form a combined column sensing signal 56 in the analog domain. The combined column sensing signal 56 includes a frequency component for each excitation frequency used for column excitation.

The combined column sensing signal 56 is digitized to form a digitized combined column sensing signal that is frequency-domain transformed to obtain one or more column sensing values 60. The digitization and frequency-domain transformation may be performed via an analog-to-digital converter (ADC) and a Discrete Fourier Transform (DFT) processor, collectively shown as circuitry 58 in the diagram. Alternatively, the circuitry 58, which may be referred to as "digitizing circuitry 58", may perform only the signal digitization, with the processing circuitry 44 performing the frequency-domain transformation used to obtain the column sensing values 60.

The column sensing values 60 correspond to the excitation frequency or frequencies used for exciting the one or more column lines 18. That is, the frequency-domain transformation of the digitized version of the combined column sensing signal 56 produces frequency-domain values, with each value corresponding to a particular frequency. There will be a frequency-domain value for each excitation frequency used for exiting the one or more column lines 18 and there may be additional frequency-domain values produced by the transformation, e.g., as a consequence of noise or other factors. Therefore, it shall be understood that any statement herein that the column sensing values 60 are obtained via frequency-domain transformation of the digitized version of the combined column sensing signal 56 accounts for processing details such as ignoring any frequency-domain values not corresponding to the excitation frequency or frequencies of interest and selecting the particular one or ones of the frequency-domain values that correspond to the column-excitation frequency or frequencies as the column sensing values 60. Each such column sensing value 60 has an amplitude or magnitude that reflects whether a touch input was present or absent in the corresponding columnar area of the touch surface 12.

The same read further comprises the processing circuitry 44 controlling the reading circuitry 42 to apply one or more row excitation signals 62 simultaneously to input ends 32 of one or more of the row lines 28, whereby corresponding row sensing signals 64 from output ends 34 of the one or more involved row lines 28 are combined via the combiner 54 to form a combined row sensing signal 66 in the analog domain. The combined row sensing signal 66 is digitized via the digitizing circuitry 58 to form a digitized combined row sensing signal, which is frequency-domain transformed to obtain one or more row sensing values 68. As explained for the column sensing values 60, the frequency-domain transformation of the digitized version of the combined row sensing signal 66 may produce a number of values corresponding to different frequencies, such that obtaining the row sensing value(s) 68 includes selecting the particular one or ones of the frequency-domain values that correspond to the excitation frequency or frequencies used for the read.

The figure shows a connection "60/68" going from the digitizing circuitry 58 into the processing circuitry 44 and this should be understood as indicating that column sensing values 60 and row sensing values 68 are provided to or otherwise obtained by the processing circuitry 44. Note that time multiplexing may be involved, such as where the reading circuitry 42 first excites the column(s) 14 to be read in a given read operation (i.e., a read cycle), and then excites the row(s) 16 to be read in the same given read operation. The generation of the column sensing values 60 and the row sensing values 68 may also be time multiplexed, e.g., separate frequency-domain transforms performed. Alternatively, the acquisition of the combined column sensing signal 56 and the combined row sensing signal 66 is multiplexed, along with multiplexing of the corresponding digitization operations used to obtain the digital versions of those signals, with a single frequency-domain transform then applied to buffered samples representing both the combined column sensing signal 56 and the combined row sensing signal 66.

The number of column sensing values 60 may equal the number of row sensing values 68 or there may be a greater or lesser number of column sensing values 60 in comparison to the row sensing values 68. The numbers depend on the number of separate excitation frequencies used for column excitation in the read operation, and on the number of separate excitation frequencies used for row excitation in the read operation. Any given read operation further comprises the processing circuitry 44 detecting touch inputs by evaluating the one or more column sensing values 60 and the one or more row sensing values 68. Again, for any given read operation, there will be as many column sensing values 60 as there were separate excitation frequencies used for column-line excitation and there will be as many row sensing values 68 as there were separate excitation frequencies used for row-line excitation.

In one or more embodiments, the processing circuitry 44 is configured to control one or more aspects of reading the touch sensor 10 by obtaining touch-control information from a software application 74 ("SW APP") supported by host processing circuitry 70 of a host device 72 that includes the touch sensor 10. The touch-control information indicates, for example, one or more regions of the touch surface 12 to be read. For example, indicated regions correspond to regions where touch controls are displayed by the software application 74. The host device 72 may further include interface and/or communication circuitry 76 (depicted as "INTERFACE/COMM. CIRCUITRY"). In this regard, the touch sensor 10 in at least one embodiment comprises a touch screen or is included within a touch screen assembly, such that the software application 74 displays touch-responsive controls, such as buttons, sliders, or the like, on the touch screen and the apparatus 40 is used to detect user touches directed to one or more of the touch controls displayed on the touch surface 12 of the touch sensor 10.

The processing circuitry 44 in one or more embodiments is configured to choose the number of separate excitation frequencies used for the one or more column excitation signals 50 according to the number of individual column lines 18 to be distinguished among the one or more column lines 18 that are excited for any given read. Similarly, in one or more embodiments, the processing circuitry 44 is further configured to choose the number of separate excitation frequencies used for the one or more row excitation signals 62 according to the number of individual rows 16 to be distinguished among the one or more rows 16 that are excited for the read.

The number of excitation frequencies used for exciting columns 14 in a given read may equal the number of column lines 18 that are excited for the read or may be smaller than the number of excited column lines 18—i.e., multiple column lines 18 may be excited using the same excitation frequency. Likewise, the number of excitation frequencies used for exciting rows 16 in a given read may equal the number of row lines 28 that are excited for the read or may be smaller than the number of excited row lines 28—i.e., multiple row lines 28 may be excited using the same excitation frequency.

To apply the one or more column excitation signals 50 or row excitation signals 62, the processing circuitry 44 in one or more embodiments is configured to select one or more excitation frequencies from a larger set of excitation frequencies used for reading the overall touch surface 12 or for reading targeted portions of the overall touch surface 12. In at least one such embodiment, the processing circuitry 44 is configured to select the one or more excitation frequencies from the larger set of excitation frequencies by selecting a contiguous subset of excitation frequencies from the larger set of excitation frequencies.

For example, if the overall set of excitation frequencies includes frequencies f1, f2, f3, and so on, in order of increasing frequency, the processing circuitry 44 may be configured to select f1 first, and then, in dependence on how many excitation frequencies are to be used, select f2, and so on. In at least one such embodiment, to select the one or more excitation frequencies from the larger set of excitation frequencies, the processing circuitry 44 is configured to determine a number of excitation frequencies to be used and select that number of lowest-frequency ones among the larger set of excitation frequencies. Other embodiments, however, use other selection strategies.

Noise measurements corresponding to individual excitation frequencies in the larger set of excitation frequencies are available in at least one embodiment. Correspondingly, to select the one or more excitation frequencies from the larger set of excitation frequencies, the processing circuitry 44 is configured to determine a number of excitation frequencies to be used and select that number of lowest-noise ones among the larger set of excitation frequencies, with the selecting performed in order of increasing excitation frequency. As an example, the processing circuitry 44 may be configured to measure the noise detected on respective ones of the excitation frequencies in the larger set(s) of excitation frequencies used for full reads of the touch sensor 10 and use those noise measurements to decide which subset(s) of excitation frequencies to use when performing a partial read of the touch sensor 10.

Figure 5A:
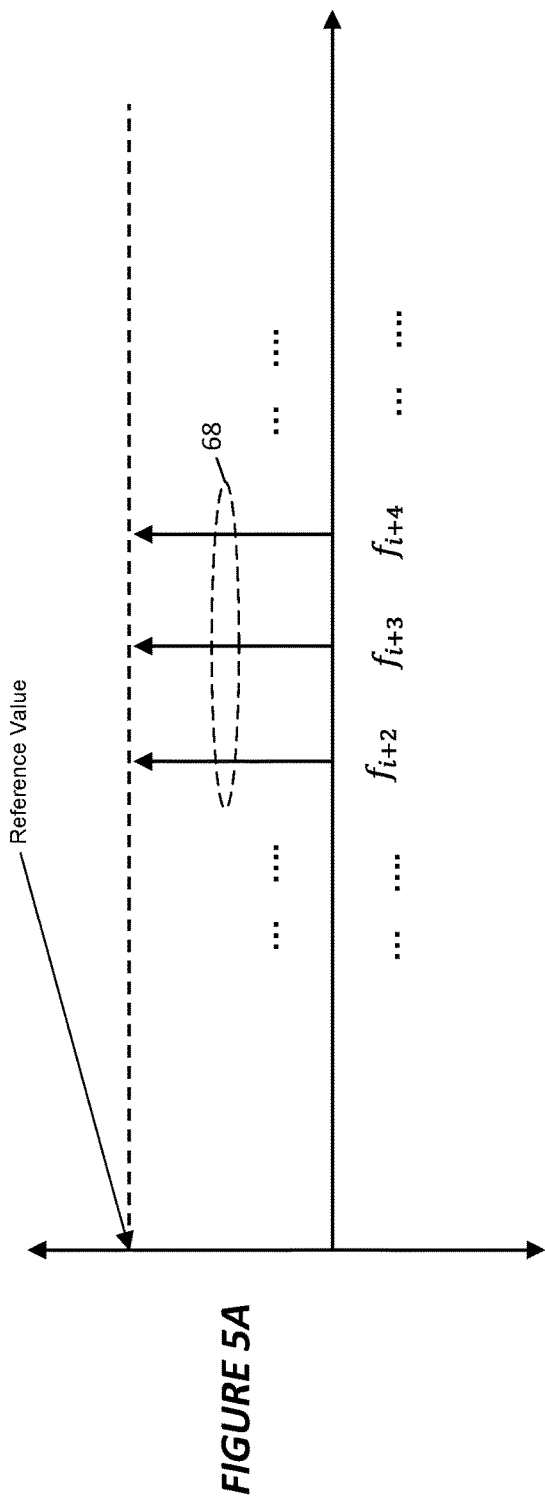
Figure 5B:
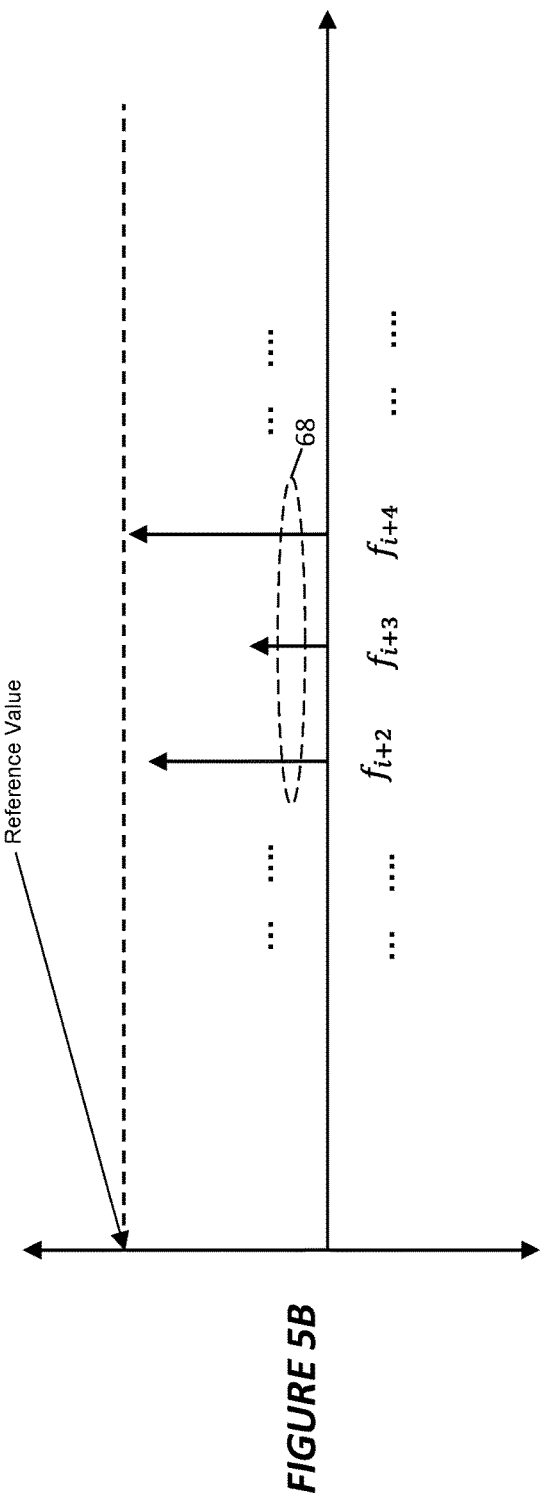

FIG. 4A depicts example column sensing values 60 for three excitation frequencies $f_{i+1}$, $f_{i+2}$, and $f_{i+3}$, produced by a read operation in the absence of any touch inputs involving any of the column lines 18 that were excited using any of the three excitation frequencies $f_{i+1}$, $f_{i+2}$, and $f_{i+3}$. In the absence of any touch inputs, the magnitudes of the three column sensing values 60 are at or within some defined margin of a reference value corresponding to the voltage of the excitation signals. FIG. 4B illustrates a read operation where one or more of the one or more column line(s) 18 that were excited via excitation signals at the $f_{i+2}$ frequency were involved in a touch input, resulting in the column sensing value 60 for the $f_{i+2}$ frequency exhibiting a lower magnitude. FIGS. 5A and 5B are similar to FIGS. 4A and 4B but show example row sensing values 68 for a read where there is no touch input (FIG. 5A) and for a read where there is a touch input to one or more row lines 28 excited with the excitation frequency $f_{i+2}$.

Figure 6:
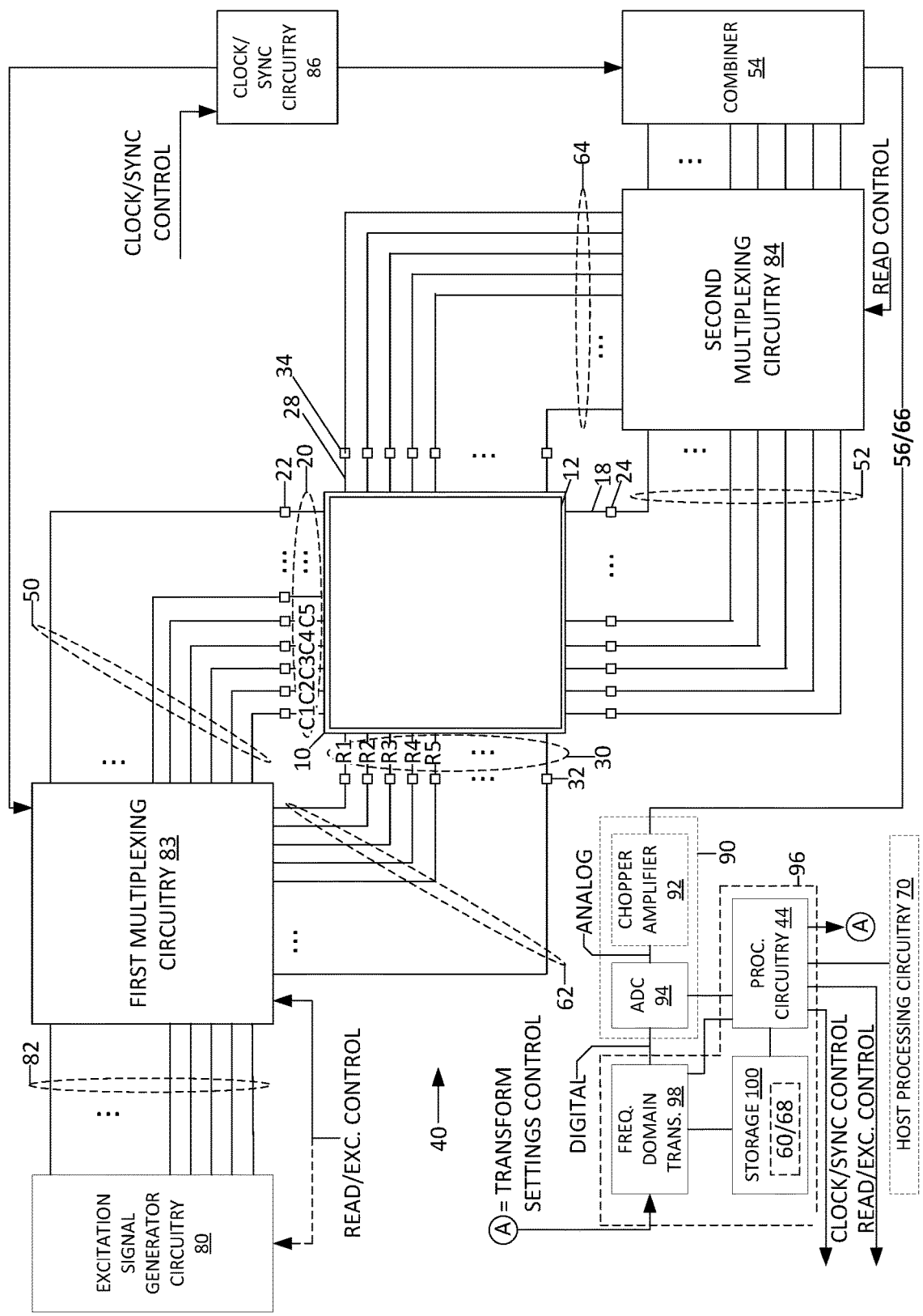
FIG. 6 is a block diagram of example details for the apparatus of FIG. 3.

FIG. 6 depicts further example details for the arrangement of FIG. 3. Excitation signal generator circuitry 80 generates a set of excitation signals 82, with each excitation signal being, for example, an analog signal at a specific frequency, such as a sinusoidal analog waveform having an amplitude at some defined voltage. The excitation signal generator circuitry 80 may be configured to generate excitations signals 82 at as many unique frequencies as are needed for detecting and resolving a certain number of simultaneous touch inputs in the context of the apparatus 40 performing hierarchical reading of the touch sensor 10. A hierarchical read includes two or more hierarchical levels of reading, such as where the touch surface 12 (or a particular portion thereof) is read repeatedly at a first or top-level macro resolution until a touch input or inputs are detected at the macro resolution, and at least one second or lower-level read is performed, to resolve the touch locations of the detected touch input(s) at a full resolution.

To understand macro resolutions versus full resolution, consider a region of the touch surface 12 that involves four column lines 18 and four row lines 28. Detecting touches within that region at full resolution means energizing each column line 18 with a separate excitation frequency, so that there will be a column sensing value 60 in the frequency domain for each column line 18 in the region, and also energizing each row line 28 with a separate excitation frequency, so that there will be a row sensing value 68 in the frequency domain for each row line 28 in the region. Conversely, reading the same region at a macro resolution means using fewer excitation frequencies than there are column lines 18 and/or using fewer excitation frequencies than there are row lines 28.

In a particular example, a top-level or coarsest macro resolution means using a single excitation column frequency and a single row excitation frequency, for detecting touch inputs in the region. There may be further, less coarse macro resolutions used in one or more lower levels included in a hierarchical read, such as where a region is read using a single column excitation frequency and multiple row excitation frequencies, or vice versa. The terms "macro resolution" or "reduced resolution" may additionally refer to energizing (exciting) fewer than all column lines 18 or row lines 28, e.g., such as where only every other column line 18 (or row line 28) is energized or may additionally refer to the use of excitation signals at a voltage lower than used for full-resolution reading.

As one example of hierarchical reading implemented by the apparatus 40, consider an embodiment of the apparatus 40 that is configured to perform a method of interfacing with a touch sensor 10 having a grid of column lines 18 and row lines 28 for detecting touch inputs to a touch surface 12 of the touch sensor 10. The method includes reading the touch sensor 10 on a hierarchical basis, where each reading of the touch sensor 10 comprises applying one or more excitation frequencies to one or more of the column lines 18 or row lines 28, to obtain corresponding column sensing signals 52 or row sensing signals 64, applying a frequency-domain transform to the corresponding column sensing signals 52 or row sensing signals 64, and evaluating transform values corresponding to the one or more excitation frequencies, to detect touch inputs to the touch sensor 10.

In particular, the hierarchical reading in this example embodiments comprises reading the touch sensor 10 using a reduced excitation-frequency resolution, in which there are fewer separate column or row excitation frequencies used than there are column lines 18 or row lines 28 excited for the reading and, responsive to detecting a touch input using the reduced excitation-frequency resolution, reading the touch sensor 10 at an increased excitation-frequency resolution, for improved discrimination of a touch location of the touch input. The method may also include using a reduced physical resolution for reading the touch sensor 10, at least when reading the touch sensor using the reduced excitation-frequency resolution and, correspondingly using an increased physical resolution when reading the touch sensor 10 using the increased excitation-frequency resolution. The reduced physical resolution refers to leaving one or more column lines 18 or row lines 28 unenergized during a read.

The total number of unique excitation frequencies needed by the apparatus 40 depends on the number of simultaneous touches to be detected and resolved by the apparatus 40 in the hierarchical reading context. Consider an example case where the apparatus 40 monitors for touch inputs to the touch surface 12 of a touch sensor 10 (or monitors a particular portion of the touch surface 12) based on logically dividing the touch surface 12 or portion thereof into macro regions. Each macro region involves multiple column lines 18 or row lines 28, where "or" in this disclosure means one or both, unless otherwise noted or clear from the context.

A particular sensing line of the touch surface 12, e.g., any particular column line 18 or row line 28, is considered as being "involved" with a particular region of the touch surface 12 if it passes through the region or bounds the region, i.e., runs adjacent to the boundary of the region. Correspondingly, a rectangular arrangement of macro regions effectively forms macro columns and macro rows— i.e., a macro column spans two or more column lines 18 and a macro row spans two or more rows. As such, each macro column or macro row involves at least two sensing lines.

If the apparatus 40 uses a single excitation frequency for each macro column and each macro row, it cannot reliably detect multiple simultaneous touches within the same macro region, but it can reliably detect simultaneous touches in different macro regions and then use one or more further, lower-level reads to determine those multiple touch locations at full resolution. The number of simultaneous touches to be detected at the highest or coarsest macro resolution used for hierarchical reading in combination with the number of column lines 18 and row lines 28 involved in each macro region dictates the maximum number of separate excitation frequencies needed by the apparatus 40.

Thus, for hierarchical reads as disclosed herein, the processing circuitry 44 controls the first multiplexing circuitry 83 to determine how many and which ones of column lines 18 are excited, and to determine how many separate excitation frequencies are used. In this regard, the first multiplexing circuitry 83 can "connect" the same excitation signal 82—or voltage- or current-buffered versions thereof—to more than one column excitation signal 50 and/or to more than one row excitation signal 62, thereby allowing two or more of the active column excitation signals 50 and/or two or more of the active row excitation signals 62 to be at the same excitation frequency during any given read. Read control lines into the first and second multiplexing circuitry 83 and 84, with corresponding clocking/synchronization provided via the clock/sync circuitry 86, allow for dynamic configuration of such operations on the fly.

In one or more embodiments, the processing circuitry 44 of the apparatus 40 outputs read control signals to the first and second multiplexing circuitry 83 and 84, to control: (a) which columns 14 and/or which rows 16 are excited during a read of the touch sensor 10, and, in at least one embodiment, (b) the frequency resolution used for the read—i.e., how many distinct excitation frequencies are used for exciting the columns 14 or rows 16. In this respect, the first multiplexing circuitry 83 in one or more embodiments includes a crossbar switching circuit or the like, for selectable mapping of individual excitation signals 82 to any one or more of the columns 14 or rows 16 (i.e., to any one or more of the column lines 18 and/or the row lines 28), such that the processing circuitry 44 decides which excitation frequencies are used to perform a read of the touch sensor 10. Further, any given read operation includes the processing circuitry 44 controlling or otherwise configuring the frequency-domain transform circuitry 98, i.e., for "extracting" the column sensing and row sensing values 60 and 68, corresponding to the excitation frequency or frequencies used to excite the column line(s) 18 and the row line(s) 28 that were energized for the read.

An example signal processing chain for performing reads of the touch sensor 10 includes analog circuitry 90 for receiving the analog-domain combined column sensing signal 56 and combined row sensing signal 66. Such circuitry comprises, for example a chopper amplifier 92 and an analog-to-digital-converter (ADC) 94. The chopper amplifier 92 may or may not be included and provides a mechanism for reducing noise in the combined column sensing signal 56 and the combined row sensing signal 66. The ADC 94 converts the combined column sensing signal 56 and the combined row sensing signal 66 into the digital domain—i.e., produces digital samples taken at discrete times from the analog waveforms constituting the combined column sensing signal 56 and the combined row sensing signal 66.

Digital circuitry 96 includes a frequency-domain transform circuit 98, storage 100, and the processing circuitry 44. The frequency-domain transform circuit 98 may be implemented as fixed hardware or may be implemented via special adaptation of general-purpose processing circuitry via programmatic configuration. In that regard, the processing circuitry 44 may be fixed or dedicated circuitry or programmatically configured circuitry or a mix of both. The processing circuitry 44 in one or more embodiments comprises a microprocessor, microcontroller, DSP, or other digital processing circuitry that operates as described herein based at least in part on the execution of computer program instructions, e.g., held in the storage 100.

The storage 100 comprises one or more types of computer-readable media and may include one or more types of memory circuits, including volatile and/or non-volatile memory circuits or other forms of storage. In one or more embodiments, the storage 100 comprises or includes buffer memory for buffering the digital sample values constituting the digitized versions of the combined column sensing signal 56 and the combined row sensing signal 66, for frequency-domain transformation, and for holding the resulting column sensing values 60 and row sensing values 68, for evaluation by the processing circuitry 44 for touch-input detection.

Also as shown, the processing circuitry 44 may interface with host processing circuitry 70. For example, the processing circuitry 44 may provide a high-level communication interface for touch detection and control by the host processing circuitry 70 and may receive information from the host processing circuitry 70, such as information about which region(s) of the overall touch surface 12 are to be read or are "active" with respect to a software application 74. The processing circuitry 44 uses such information, for example, to identify the region(s) to be read during any given read operation.

With the above details in mind, an apparatus 40 according to one or more embodiments is configured for interfacing with a touch sensor 10 having a grid of column lines 18 and row lines 28 for sensing touch inputs to a touch surface 12 of the touch sensor 10. The apparatus 40 comprises reading circuitry 42 and processing circuitry 44 operative to read the touch sensor 10 via the reading circuitry 42.

A read of the touch sensor 10 is based on the processing circuitry 44 exciting one or more column lines 18 and row lines 28 with one or more excitation frequencies to produce sensing signals that are frequency-domain transformed, along with evaluating transform values corresponding to the one or more excitation frequencies. A hierarchical read comprises multiple reads, e.g., two or more reads, and it involves reading at different hierarchal levels, which are distinguished in terms of the reading resolution involved.

Particularly, the reading of the touch sensor 10 is performed hierarchically by the processing circuitry 44 being configured to read the touch sensor 10 at a first resolution that is less than a full resolution, based on logically subdividing all or a targeted zone of the touch surface 12 into multiple first regions and applying excitation frequencies on a per first region basis. Each first region involves multiple column lines 18 or row lines 28. These first regions may be understood as a top-level or coarsest set of macro regions.

As a further aspect of hierarchical reading of the touch sensor, the processing circuitry 44 is configured to perform one or more further readings of the touch sensor 10, responsive to detecting a touch input in a particular one of the first regions, to discriminate a touch location of the touch input at the full resolution. Each further reading of the touch sensor 10 by the apparatus 40 is based on further subdividing the particular first region by allocating one or more additional excitation frequencies for column or row excitation within the particular first region.

For any given read of the touch sensor 10, the processing circuitry 44 may "configure" the read in terms of deciding which column and row lines 18 and 28 are excited and at which excitation frequencies, based on outputting read/excitation control signals to the first multiplexing circuitry 83 and/or the signal generator 80. FIG. 6 depicts the read/excitation control signals as "READ/EXC. CONTROL". Correspondingly, the processing circuitry 44 adapts or otherwise configures the frequency domain circuitry 98 in dependence on which excitation frequencies are being used for the read, configuring the FFT size, sampling rate, etc. For such control, the processing circuitry 44 "outputs" control signals labeled in FIG. 6 as "TRANSFORM SETTINGS CONTROL". Note, however, that in embodiments where the frequency domain transform circuitry 98 is integrated with a microprocessor or other digital processing circuit that operates as the processing circuitry 44, the TRANSFORM SETTINGS CONTROL may be understood as internal signaling or configuration, e.g., the configuring of control registers or the like within the microprocessor.

To read the touch sensor at the first resolution, the processing circuitry 44 in one or more embodiments is configured to excite only a subset of the column or row lines 18 or 28 involved with each first region. Here, "first resolution" refers at least to resolution in the (excitation) frequency domain. Full frequency resolution refers to using as many separate excitation frequencies as there are column lines 18 (or row lines 28) to be excited within the touch-surface region of interest and reading at a lower frequency resolution refers to exciting multiple column lines 18 or row lines 28 with the same excitation frequency. Hierarchical reading thus involves at least using varying resolution in the frequency sense and may further include using varying resolution in the time domain or the physical domain.

An example of changing the time resolution comprises performing successive reads of the touch sensor 10 at a first cycle time-first periodicity-until a touch input is detected and then switching to a faster cycle time for the one or more further reads used to resolve the touch location(s) of the detected touch input(s). An example of changing the physical resolution comprises energizing fewer than all of the column lines 18 or row lines 28 within the overall touch surface 12 or within a region of interest, over one or more read cycles in the absence of detecting any touch inputs, and then increasing the number of column lines 18 or row lines 28 that are energized, at least within the region(s) of interest, for the one or more further reads of the touch sensor 10, used to resolve the location(s) of touch input(s) subsequent to initial detection of the touch input(s).

Therefore, unless otherwise noted herein, the term "resolution" refers at least to frequency resolution, but the term does not exclude the further aspects of temporal resolution and physical resolution. With that in mind, to read the touch sensor 10 at a first resolution, the processing circuitry 44 in one or more embodiments is configured to use reduced-voltage excitation signals as compared to an excitation voltage used for discriminating touch locations of touch input at the full resolution. While using reduced-voltage excitation signals may not be appropriate when attempting to determine a touch location according to full resolution, the apparatus 40 may perform successive or recurring reads of the touch sensor 10 at the first resolution and use lower-voltage excitation signals while awaiting a touch input. Upon detecting a touch input or inputs, the apparatus 40 may switch to using the regular or nominal excitation voltage, at least for exciting column lines 18 or row lines 28 in the particular region(s) of the touch surface 12 corresponding to the detected touch input(s).

To discriminate the touch location of a touch input at the full resolution, the processing circuitry 44 in one or more embodiments is configured to excite each column or row line 18 or 28 at or bordering the touch location with a separate excitation frequency. That is, in at least one embodiment, during a time when there are no touch inputs to the touch sensor 10, the apparatus 40 performs hierarchical reading of the touch sensor 10 by: (1) performing successive reads of the touch sensor 10 at a first resolution in which the touch surface 12 or a portion thereof is logically subdivided into first regions, with each first region having one excitation frequency for exciting all of the column lines 18 involved with it, and one excitation frequency for exciting all of the row lines 28 involved with it; and (2) upon detecting a touch input in one or more of the first regions, performing one or more further reads of the touch sensor 10, resulting in using per-column and per-row excitation frequencies at or around the touch location(s), for determining the touch location(s) at the full resolution.

In one embodiment, a first one of the one or more further reading divides a particular first region where a touch input was detected into multiple subregions and identifies which one of the multiple subregions contains the touch location, as a touched subregion. From there, each further reading subdivides the touched region identified in the previous further reading.

In at least one other embodiment, the one or more further readings performed after a reading at the first resolution in which a touch input was detected comprise one further reading. In this one further reading, each column line 18 involved with the particular first region where the touch input was detected is excited with a separate frequency, and each row line 28 involved with the particular first region is excited with a separate frequency.

In one or more embodiments, to read the touch sensor 10 at the first resolution, the processing circuitry 44 is configured to apply a distinct column excitation frequency to each first region and apply a distinct row excitation frequency to each first region, such that each first region is distinguished in the frequency domain as a unique pairing of column and row excitation frequencies. The distinct column excitation frequencies may be chosen as spaced-apart members of a defined set of excitation frequencies, and at least a first one of the one or more further readings uses one or more of the adjacent members in the defined set of excitation frequencies, as the one or more additional excitation frequencies allocated for column or row excitation within the particular first region.

In further aspects of the hierarchical reading according to one or more embodiments, the processing circuitry 44 is configured to configure a transformation algorithm used to obtain the transform values for each reading of the touch screen, in dependence on the number of distinct excitation frequencies used in the reading, and in dependence on a spacing of the distinct excitation frequencies. For example, the processing circuitry 44 tailors one or more parameters of a Fast Fourier Transform (FFT) algorithm, to account for the number of separate excitation frequencies used for reading the columns 14 or rows 16, and to account for the spacing of the excitation frequencies. Such tailoring allows the transformation to be run at lower power or reduced complexity, when reading the touch sensor 10 using reduced resolution.

In one or more embodiments, the processing circuitry 44 is configured to configure the first regions according to information provided by a software application 74 running on a host device or system 72 that includes the touch sensor 10. As such, the number, shape, and locations of the first regions may change responsive to signaling from the software application 74. For example, in one or more embodiments, the processing circuitry 44 is configured to change the arrangement of the first regions over successive readings of a touch sensor 10 at the first resolution. Further, in one or more embodiments, the processing circuitry 44 is configured to use a first cycle time for reading a touch sensor 10 at the first resolution and switch to a faster cycle time or cycle times for the one or more further readings of the touch sensor 10.

Figure 7B:
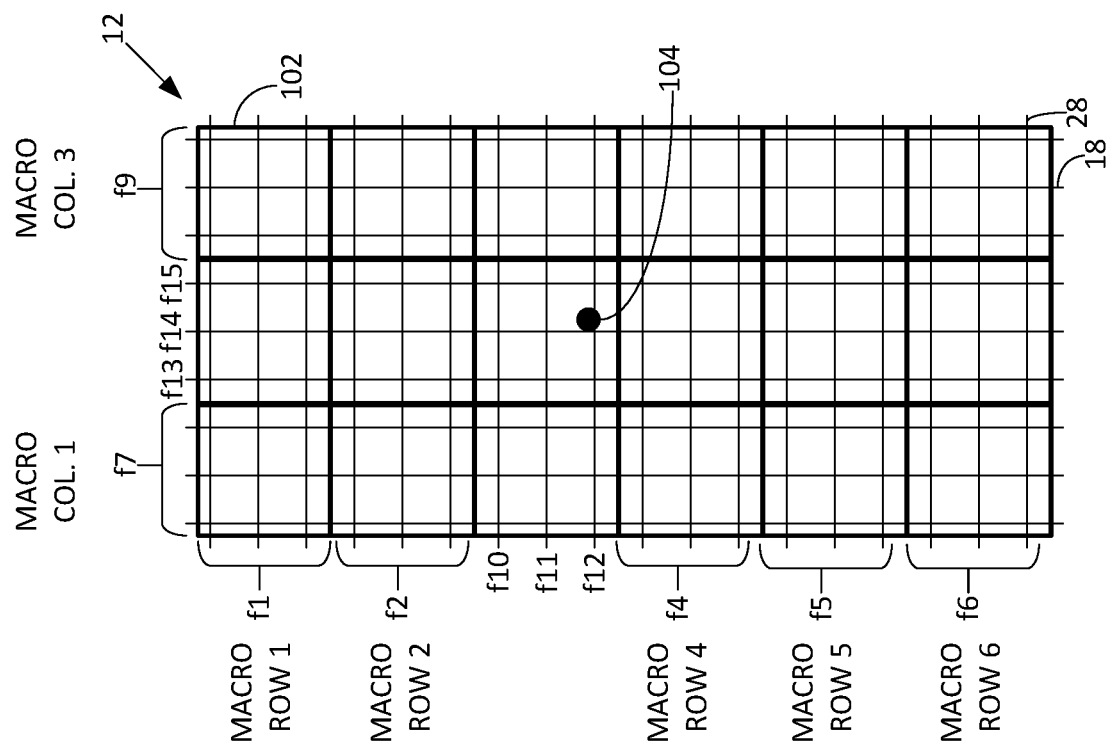
FIGS. 7A and 7B are diagrams depicting an example use of varying frequency resolutions for performing a hierarchal read of a touch sensor.
Figure 7A:
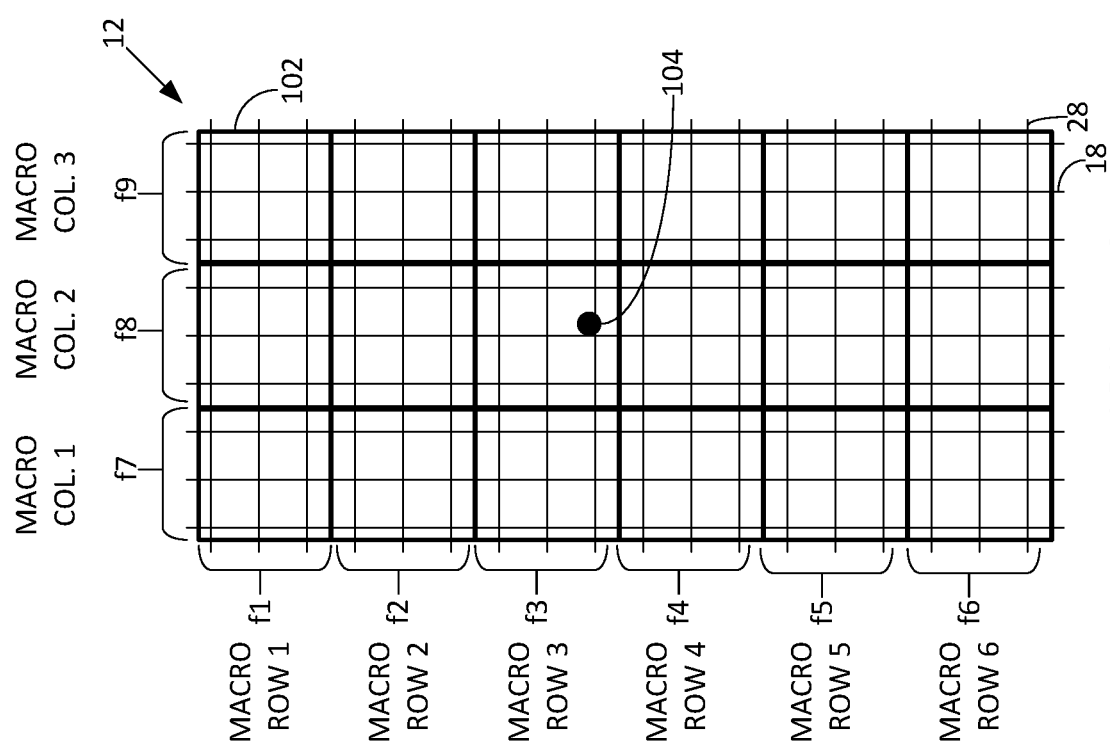

FIG. 7A illustrates an example logical subdivision of a touch surface 12 of a touch sensor 10 into first regions 102, as may be used by the processing circuitry 44 to monitor for touch inputs using a reduced frequency resolution. The logical subdivisions effectively form macro columns and macro rows, with each macro column involving multiple column lines 18 of the touch sensor 10 (a column "group") and each macro row involving multiple row lines 28 of the touch sensor 10 (a row "group"). In at least one embodiment, the macro columns each include the same number of column lines 18, subject to the limits of integer division, and the same holds for the macro rows.

In an example of hierarchical reading, in the absence of any touch inputs to the touch surface 12, the processing circuitry 44 reads the touch sensor 10 on a per first region basis. Reading the touch sensor 10 on a per first region basis means that the processing circuitry 44 uses only as many excitation frequencies as are needed to distinguish between the individual first regions 102 in the frequency domain results obtained by transforming digitized versions of the combined column sensing signal 56 and the combined row sensing signal 66 into the frequency domain.

In more detail, reading the touch sensor 10 at a first resolution based on logically subdividing the overall touch surface 12, or a targeted region thereof, into first regions 102 comprises: (1) simultaneously exciting at least one column line 18 in each column group, where each column group has a different excitation frequency; (2) digitizing the resulting combined column sensing signal 56; (3) frequency transforming the digitized combined column sensing signal 56 to obtain column sensing values 60 corresponding to the respective column groups; (4) simultaneously exciting at least one row line 28 in each row group, where each row group has a different excitation frequency; (5) digitizing the resulting combined row sensing signal 66; (6) frequency transforming the digitized combined row sensing signal 66 to obtain row sensing values 68 corresponding to the respective row groups; (7) jointly evaluating the column sensing values 60 and row sensing values 68 to detect whether there are any active touch inputs in any of the first regions 102; and (8) if there are no detected touch inputs, repeat reading the touch sensor 10 at the first resolution, according to a defined read cycle time, e.g., reading the touch sensor 10 at the first resolution ten times per second (10 Hz).

For the example excitation frequencies used in FIG. 7A, evaluating whether there is a touch input present in the first region 102 located at the {MC1, MR1} position means evaluating the column sensing value 60 corresponding to the frequency f7 and evaluating the row sensing value 68 corresponding to the frequency f1. Here, "MC1" denotes the macro column 1, and "MR1" denotes the macro row 1. Each of the first regions 102 is evaluated for touch-input detection by evaluating the pair of column sensing and row sensing values 60 and 68 corresponding to the macro-row frequency and macro-column frequency associated with each first region 102.

With the example touch location 104 shown in FIG. 7A, reading the touch sensor 10 at the first resolution results in the processing circuitry 44 identifying the first region 102 at {MC1, MR3} as having a touch input, and it performs one or more further reads of the touch sensor 10 to resolve the touch location 104 at full resolution. To do so, the processing circuitry 44 "adds" additional excitation frequencies for increased column/row resolution in the macro row and column associated with the first region 102 that contains the touch location 104. The processing circuitry 44 may also shift to a faster read cycle. The processing circuitry 44 uses its read/excitation control signals to configure the excitation signal generator 80 and/or multiplexing circuitry 83, to control which excitation frequencies are applied to which column and row lines 18 and 28.

The one or more further reads may comprise just one further read, based on the further read using separate excitation frequencies for each column line 18 and each row line 28 in the macro column and macro row involved in the touch location 104. FIG. 7B illustrates such an approach, where the three row lines 28 involved with macro row 3 are excited with separate excitation frequencies f10, f11, and f12. Likewise, the three column lines 18 involved with macro column 2 are excited with separate excitation frequencies f13, f14, and f15. Notably, even though the processing circuitry 44 uses full resolution for the macro row and macro column involved in the touch location 104, it may use the first resolution (the original, coarser resolution) for reading the macro columns and macro rows not involved in the touch location 104. Of course, if multiple touch locations are detected while reading the touch sensor 10 at the first resolution, the processing circuitry 44 increases the reading resolution for all macro rows and macro columns containing a first region 102 in which a touch input was detected.

FIGS. 8A-8D are similar to FIGS. 7A and 7B, but they illustrate an embodiment where the processing circuitry 44 is configured to perform what amounts to a binary-tree search for resolving a touch location 104. This divide-and-conquer technique can, of course, be used to detect multiple touch inputs occurring at or around the same time, and it may have particular advantages for very large touch sensors 10 or touch sensors 10 that otherwise have very dense arrays of column lines 18 and row lines 28.

Assume that no touch inputs are active and the processing circuitry 44 is therefore reading the touch sensor 10—the whole touch surface 12 or a particular portion of the touch surface 12—at a first resolution defined by one macro column (MC1) and two macro rows (MR1, MR2). The processing circuitry 44 may perform successive reads of the touch sensor 10 using this resolution/arrangement until it detects one or more touch inputs, with the example showing a single touch input occurring at a touch location 104. The processing circuitry 44 recognizes that the touch location 104 is within the first region 102 at {MC1, MR2} and it increases the resolution in a next read (or a next succession of reads) in the affected first region 102. Particularly, as shown in the example of FIG. 8B, the processing circuitry 44 increases the macro column resolution by adding a further column excitation frequency f4, effectively dividing the prior single macro column MC1 in half, forming two smaller macro columns MC2 and MC3. This further subdivision allows the processing circuitry 44 to quickly determine whether the touch location 104 is in MC2 or MC3.

Having determined that the touch location 104 is in MC2, the processing circuitry 44 increases the macro-row resolution and performs one or more further reads, based on adding another row excitation frequency, for dividing MR2 into MR3 and MR4. See FIG. 8C. This further subdivision allows the processing circuitry 44 to determine whether the touch location 104 is in MR3 or MR4.

With the processing circuitry 44 having determined that the touch location 104 is in MC2 and MR4, the processing circuitry 44 then performs one or more further reads, using a full per-column and per-row resolution in the region 102 corresponding to {MC2, MR4}. FIG. 8D depicts such operations, showing the use of per-row excitation frequencies f5, f6, f7, and f8 for the row lines 28 that were involved with MR4, and showing the use of per-column excitation frequencies f1, f9, f10, f11, and f12 for the column lines 18 that were involved with MC2.

FIG. 9 illustrates an embodiment comprising a method 900 of reading a touch sensor 10 on a hierarchical basis. The method 900 includes performing (Block 902) a hierarchical read of a touch sensor 10—either the entire touch surface 12 or a particular portion of the touch surface 12, such as might be done with large touch surfaces 12.

As explained earlier, reading the touch sensor 10 comprises exciting one or more column lines 18 and row lines 28 with one or more excitation frequencies to produce sensing signals that are frequency-domain transformed, and evaluating transform values corresponding to the one or more excitation frequencies. In that context, the reading is performed hierarchically by:

reading (Block 904) the touch sensor 10 at a first resolution that is less than a full resolution, based on logically subdividing all or a targeted zone of the touch surface 12 into multiple first regions 102 and applying excitation frequencies on a per first region basis, each first region 102 involving multiple column lines 18 or row lines 28; and responsive to detecting a touch input in a particular one of the first regions, performing (Block 906) one or more further readings of the touch sensor 10 to discriminate a touch location of the touch input at the full resolution, each further reading based on further subdividing the particular first region 102 by allocating one or more additional excitation frequencies for column or row excitation within the particular first region 102.

In one or more embodiments, reading the touch sensor 10 at the first resolution comprises exciting only a subset of the column lines 18 or row lines 28 involved with each first region 102. For example, only every other column line 18 or row line 28 is energized during any given read cycle, or every third line, or so on. The number of column lines 18 or row lines 28 that are energized in any given read cycle for each macro column or macro row formed by logically subdividing the touch surface 12 for the read cycle depends on one or more variables, such as, for example, a targeted physical resolution for detecting touches, the size of the macro columns or macro rows, etc. Again, the physical resolution of any given read of the touch sensor 10 depends on the underlying density or spacing of column lines 18 and row lines 28, which generally is fixed, and further depends on how many such lines are energized for the read.

In one or more embodiments, reading the touch sensor 10 at the first resolution comprises using reduced-voltage excitation signals as compared to an excitation voltage associated with discriminating touch locations of touch input at the full resolution. For example, when reading any macro row or when reading any macro column, the processing circuitry 44 may control the reading circuitry 42, to use a reduced excitation voltage. A macro row contains two or more row lines 28 and a macro column contains two or more column lines 18. Thus, performing a hierarchical read of the touch sensor 10 can be understood as the processing circuitry 44 logically dividing the touch surface 12, or a particular portion of the touch surface 12, into macro columns and macro rows, detecting a touch input in one or more of the macro columns and macro rows, and then further subdividing the macro columns and macro rows where the touch input(s) were detected. The further subdivisions may constitute a single step, where the processing circuitry 44 uses individual excitation frequencies for each column line 18 and each row line 28 in each macro column and macro row where a touch input was detected (see FIGS. 7A and 7B), or it may use further incremental divisions of the involved macro rows and macro columns into successively smaller macro rows and columns (see FIGS. 8A-8D).

Whether in one step or multiple steps, the method 900 according to one or more embodiments includes discriminating each detected touch location at the full resolution, meaning that it excites each column line 18 or row line 28 at or bordering the touch location with a separate excitation frequency. See FIGS. 7B and 8D. As shown in the example context of FIGS. 8A and 8B, a first one of the one or more further readings in a hierarchical read divides the particular first region where a touch input was detected into multiple subregions and identifies which one of the multiple subregions contains the touch location, as a touched subregion. Each further reading of the hierarchical reading subdivides the touched region identified in the previous further reading. See FIGS. 8C and 8D.

The distinct column excitation frequencies used for exciting column lines 18 may be chosen as spaced-apart members of a defined set of excitation frequencies. At least a first one of the one or more further readings in a hierarchical read uses one or more of the adjacent members in the defined set of excitation frequencies, as the one or more additional excitation frequencies allocated for column or row excitation within a particular first region.

Consider another example scenario involving a defined set of excitation frequencies {f1, f2, f3, f4, f5, f6, f7, . . . , fn}, where this "fundamental" set of frequencies has a spacing of, say, 40 kHz. To form an initial pair of macro columns MC1 and MC2 for a first hierarchical level of a hierarchical read, the processing circuitry 44 may choose f1 and f3. Similarly, to form an initial pair of macro rows MR1 and MR2 for the first hierarchical level, the processing circuitry 44 may choose f5 and f7.

To subdivide MC1 at the next hierarchical level of the hierarchical read, the processing circuitry 44 would use f2, or to subdivide MC2, the processing circuitry 44 would choose f4 (or f2). Similarly, to subdivide MR1, the processing circuitry 44 would choose f6 (or f4), or to subdivide MR2, the processing circuitry 44 would choose f6 (or f8). With a next lower hierarchical level of reading in the hierarchical read using frequencies adjacent to the frequencies used in the previous read, the configuration and updating of the frequency-domain transform parameters used in each hierarchical read may be simplified. Other approaches to selecting excitation frequencies from a larger defined set of excitation frequencies, for use in successive hierarchical levels of reading the touch sensor 10 are also contemplated.

The method 900 may include configuring the frequency-domain transformation algorithm used to obtain the transform values for each reading of the touch sensor 10, in dependence on the number of distinct excitation frequencies used in the reading, and in dependence on a spacing of the distinct excitation frequencies. Further, the method 900 may include configuring the first regions 102 according to information provided by a software application 74 running on a host system 72 that includes the touch sensor 10. That is, the macro-column and macro-row subdivisions of the touch surface 12 may be dictated, or at least informed, by the software application 74, e.g., regarding its current operating mode, the number, size, and location of active touch controls displayed on the touch surface 12, etc. Further, the method 900 may include changing the arrangement of the first regions 102 over successive readings of the touch sensor 10 at the first resolution, e.g., to jitter or move the subdivision boundaries to eliminate surface locations that result in ambiguity as to which region is involved in a touch event. Still further, the method 900 may include using a first cycle time for reading the touch sensor 10 at the first resolution and switching to a faster cycle time or cycle times for the one or more further readings of the touch sensor 10.

With the above example details in mind, the present disclosure may be understood as proposing a technique for reading a touch sensor 10, where the problems associated with power consumption and circuit complexity are solved by splitting reads of the touch sensor 10 into multiple hierarchical stages—i.e., a hierarchical read that includes two or more hierarchical levels, with each hierarchical level involving one or more read cycles. Here, each read cycle comprises the acquisition of column sensing values 60 and row sensing values 68 for the column and row excitation frequencies in use. Performing multiple, successive such read cycles allows for the filtering of column sensing values 60 and row sensing values 68.

Upon initialization or after some window of time during which no touch inputs are detected, the processing circuitry 44 may operate a first hierarchical level of reading, where a coarsest set of macro columns and macro rows are used to read the touch sensor 10. Upon detecting one or more touch inputs at this first hierarchical level, the processing circuitry 44 then performs at least a second, lower level of hierarchical reading, based on further subdividing the macro column(s) and macro row(s) in which touch input(s) were detected at the first hierarchical level. Similarly, in embodiments where two or more hierarchical levels of reading are used below the first hierarchical level, each next hierarchical level further subdivides the macro rows/columns for which touch inputs were detected at the prior hierarchical level.

The frequencies used at every hierarchical level may be selected from a larger set of predefined frequencies, which, for example, may include at least as many distinct frequencies as there are columns 14 or rows 16 of the touch sensor 10. In addition, beyond varying the frequency resolution during a hierarchical read, the processing circuitry 44 or the host controller (host processing circuitry 70) could vary the number of capacitors or other sensors that constitute the column lines 18 and row lines 28, in dependence on the hierarchical level of a read. That is, for higher (coarser) hierarchical levels of reading the touch sensor 10, not all capacitors or other sensors that are used to form the column lines 18 and row lines 28 need to be switched into active use, thus saving energy. As the hierarchical level of reading goes lower (increasing resolution), the processing circuitry 44 and/or the host circuitry 70 can increase the number/density of active capacitors or other sensors in each column line 18 or row line 28. Moreover, the processing circuitry 44 may vary the density of energized column lines 18 or row lines 28 as a function of the hierarchical level of reading, such as where the first or top-level of a hierarchical read involves energizing only every n-th column line 18 or row line 28, with all lines or a greater density of lines energized in one or more subsequent, lower levels of the hierarchical read.

These variations between levels in a hierarchical read allow for much faster and more efficient frequency-domain operations, especially for large touch surfaces 12. In addition, dramatic reductions in operating power can be achieved by using the same frequency excitation frequency for multiple column lines 18 or row lines 28, as the voltage used per line can be reduced from the nominal or reference value use for exciting individual column lines 18 or row lines 28 with separate frequencies. Moreover, the proposed technique facilitates for a more centralized solution which results in a simpler circuitry design and significantly lower production cost.

Consider a case where no proximity sensors are used with respect to the touch surface 12 of a touch sensor 10 and some latency is tolerable. In this case, a touch surface 12 with R rows 16 and C columns 14 can be virtually divided into subgroups. For example, for a first hierarchical level, the R rows 16 are divided into r subgroups (a first set of macro rows defining a first touch-detection row resolution) and the (' columns 14 are divided into c subgroups (a first set of macro columns defining a first touch-detection column resolution).

For example, the touch surface 12 (or a particular portion thereof) is logically divided initially into three macro columns, MC1, MC2, and MC3, and three macro rows, MR1, MR2, and MR3. An example reading of the touch sensor 10 at this first or top hierarchical level comprises obtaining a row sensing value 68 for MR1, based on energizing one or more row lines 28 in MR1 with the same excitation frequency, and obtaining a corresponding column sensing value 60 for each of the macro columns MC1, MC2, and MC3. The macro columns MC1, MC2, and MC3 may be energized one at a time, with the same frequency used to energize one or more of the column lines 18 within the particular macro column being energized. Such processing may be repeated for each of the remaining macro rows MR2 and MR3, with the overall processing yielding a row sensing value 68 for each macro row MR1, MR2, and MR3, and further yielding a corresponding set of column sensing values 60 for each macro row. In total, the "read" of the touch sensor 10 at this hierarchical level involves (C*R)/(c*r) individual reads, with each read producing a column sensing value 60 for a particular one of the macro columns and producing a row sensing value 68 for a particular one of the macro rows. Here, C/c and R/r are integer numbers.

One or more embodiments are based on exciting every other column line 18 or row line 28 within each macro column or macro row using a nominal (a defined full excitation) voltage. If a touch happens exactly on a line that is not excited, then the two adjacent, excited lines will still experience dips in their voltages, meaning that the processing circuitry 44 can still reliability detect a touch input to the involved region. In another embodiment, the column lines 18 or row lines 28 within a macro column or macro row are excited using a reduced voltage, as compared to a defined full excitation voltage. For example, half-voltage excitation is used. However, because a touch input affects multiple lines that are excited by the same frequency, the change in the corresponding column sensing value 60 or row sensing value 68 would be detectable reliably.

Figure 10:
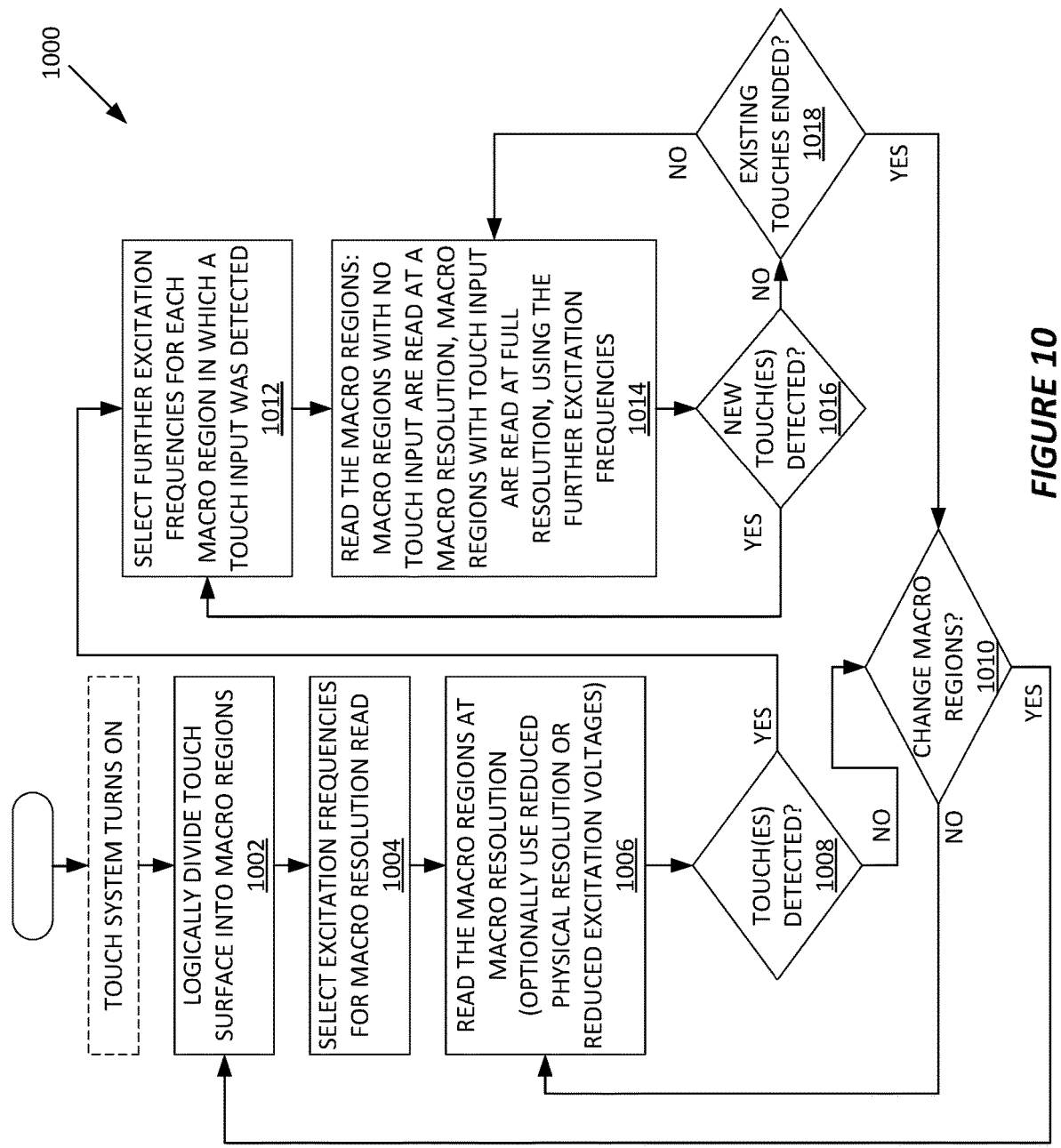
FIG. 10 is a logic flow diagram of a method of hierarchically reading a touch sensor, according to another embodiment.

FIG. 10 illustrates an embodiment comprising a method 1000 of hierarchical reading of a touch sensor 10, where there are two hierarchal levels: a first level that reads macro regions of the touch surface 12 using a macro resolution, and a second level that invoked in response to detecting one or more touch inputs at the macro resolution. The second level of hierarchical reading involves reading macro regions with touch inputs at full resolution and reading macro regions with no touch input at a macro resolution, which may be the same or altered as the first macro resolution, in dependence on whether the particular macro region is affected by reading one or more other macro regions at full resolution.

For example, referring back to FIGS. 7A and 7B for a moment, the initial, first-level hierarchical reading of the touch sensor 10 uses the same macro resolution for each of the first regions 102—i.e., the first regions 102 can be understood as forming a set of macro rows and macro columns, where the different macro rows are differentiated using different excitation frequencies and the same is done for the macro columns. However, reading any particular one of the first regions 102 at the full resolution requires using separate excitation frequencies for each row line 28 involved with the particular first region 102, and using separate excitation frequencies for each column line 18 involved with the particular first region 102.

Therefore, any first regions 102 in the same macro row as the particular first region 102 being read at full resolution will have increased frequency resolution in the row sense, and any first regions 102 in the same macro column will have increased frequency resolution in the column sense. Any first region 102 not being read at full resolution in both the row sense and the column sense may be regarded as being read at a macro resolution—i.e., a resolution coarser than full resolution but not necessary as coarse as the first resolution, where there is only one column excitation frequency and one row excitation frequency allocated for each first region 102. For example, in FIG. 7B, when reading the touch sensor 10 at the second hierarchical level, the first region 102 at the location {MC1, MR1} is at the coarsest macro resolution—i.e., one column excitation frequency (f7) and one row excitation frequency (f1). However, the next first region 102 over in the same macro row has the full frequency resolution column wise, i.e., a different frequency per column line 18, but still has a single row excitation frequency, and can therefore be regarded as also being read at a macro resolution.

According to the method 1000, a touch system turns on or otherwise initializes, where the touch system includes a touch sensor 10 and an apparatus 40 for interfacing with the touch sensor 10. The apparatus 40, alone or in cooperation with host processing circuitry 70 of the touch system running a software application 74, logically divides the touch surface 12 of the touch sensor 10 into macro regions (Block 1002) and selects (Block 1004) excitation frequencies to use for the macro regions—i.e., it selects column excitation frequencies on a per macro column basis and row excitation frequencies on a per macro row basis. The macro divisions at this point in the method 1000 represent a first or top hierarchical level for performing a hierarchical read of the touch sensor 10. The frequency selection may be based on a selection strategy that avoids noisy frequencies, e.g., ones vulnerable to interference from other parts of the touch system and/or one that simplifies the frequency-domain transformation(s) used to obtain the column sensing values 60 and the row sensing values 68 corresponding to the macro columns and the macro rows, respectively.

The method 1000 continues with reading (Block 1006) the macro regions—i.e., reading the touch sensor 10 at the first or top level macro resolution. In one or more embodiments, reading the touch sensor 10 at the first-level macro resolution also includes energizing fewer than all the column lines 18 within each macro column and/or energizing fewer than all the row lines 28 within each macro row, e.g., every other column line 18 and every other row line 28. Alternatively, reading the touch sensor 10 at the first-level macro resolution includes using reduced excitation voltages, as compared to the excitation voltage used for column excitation signals 50 and row excitation signals 62 used for full-resolution reading of any particular macro region.

If no touches are detected ("NO" from Block 1008), processing continues with determining whether to change the size, shape, or positioning of the macro regions. One or more embodiments omit this operation but changing the macro regions over multiple read cycles when reading the touch sensor 10 at the first or top-level hierarchy in a hierarchical read—i.e., the coarsest or lowest resolution of touch detection—may improve touch detection by varying where the macro-region boundaries are on the touch surface 12. If the macro regions are to be updated ("YES" from Block 1010), processing returns to Block 1002. If not ("NO" from Block 1010), processing returns to Block 1006, for performing another read cycle at the first- or top-level macro resolution.

During a time when no touches are detected, the read cycle represented by Block 1006 may be performed on a repeating basis, e.g., at 10 Hz or another relatively low cycle rate for power savings. Of course, a faster cycle rate may be used for improved responsiveness to initial touch detection, at the expense of increased power consumption.

Upon one or more touch inputs being detected ("YES" from Block 1008), processing advances to Block 1012, where the method 1000 includes selecting further excitation frequencies for each macro region in which a touch input was detected. The "further" excitation frequencies for any particular macro region where a touch input was detected may be as many additional row excitation frequencies as are needed to have a separate row excitation frequency for each row line 28 involved with the particular macro region. The same "further" frequency logic may be used with respect to the column lines 18 involved with the particular macro region. That is, each macro region for which a touch input was detected in the read operation carried out in Block 1006 may be read using full column/row frequency resolution in Block 1014, while the remaining macro regions may be read at less than the full column/row frequency resolution. For relation back to FIGS. 7A and 7B, the read operation in Block 1006 corresponds with FIG. 7A, and the read operation performed in Block 1014 corresponds to FIG. 7B.

The method 1000 continues with determining whether one or more new touches were detected in the read performed in Block 1014—i.e., touches involving macro regions that did not have touch inputs detected for them in the read performed in Block 1006. If so ("YES" from Block 1016), processing returns to Block 1012, where further excitation frequencies are allocated to the macro region(s) associated with the newly detected touch inputs, and the read operation of Block 1012 is repeated, with all macro regions for which touch inputs have been detected being read at full resolution, and any remaining macro regions being read at less than full resolution. Each selection of further excitation frequencies performed in Block 1012 may be based on any one or more of: avoiding noisy frequencies, avoiding frequencies that interfere with the reduced-resolution reading of any macro region for which a touch input has not been detected, or choosing frequencies that simplify any needed reconfigurations of FFT processing or other frequency-domain processing used to obtain the column sensing values 60 and the row sensing values 68.

If there were no new touches detected ("NO" from Block 1016), processing continues with determining whether the touch(es) initially detected at the top-level macro-resolution read in Block 1006 have ended. If so ("YES" from Block 1018), processing returns to Block 1010. If not ("NO" from Block 1018), processing loops back to Block 1014, for another read of the touch sensor 10.

Using reduced frequency resolution in hierarchical reading requires flexibility with respect to configuring and performing the frequency-domain transformations used to obtain the column sensing values 60 and the row sensing values 68 that are evaluated to discern the presence and location of touch inputs to the touch surface 12 of a touch sensor 10. For example, the frequency domain transform circuitry 98 in FIG. 6 operates as an FFT processor with configurable transform parameters, e.g., number of bins, sampling frequency, etc. In one or more embodiments, the apparatus 40 is configured to reduce power consumption and complexity for the frequency-domain transformation by configuring the number of frequency bins to be only enough to detect touches at a macro resolution. Such operations allow use of a reduced number of bins and/or lower sampling rates when higher or full resolution is not needed.

To account for multiple touches/users, the maximum FFT size provided by the FFT processor needs to accommodate a maximum of touches. Consider a touch surface 12 having a 1024×1024 line grid—1024 column lines 18 and 1024 row lines 28. An example hierarchical read configuration for such a touch surface 12 may define a top-level macro-read resolution by dividing the touch surface 12 into a 4×8 set of macro regions. Assume that design requirements dictate the ability to detect simultaneous touch inputs in up to four of these first-level macro regions. Doing so requires a maximum of 256 frequencies, which defines the maximum FFT size needed. Alternatively, multiple FFT processors may be used in parallel, to reduce the maximum FFT size. For example, by using four FFT processors, the maximum FFT size needed in the context of the foregoing example is 32 (256/4=32). As another example, the apparatus 40 may include four FFT processors that can take care of four users while still operating 32-point FFTs per engine. This arrangement is failure-resilient, as it includes multiple engines. Meaning that any failures will not be noticeable until maybe all the engines fail. Thus, large touch surfaces can end up having the same resolution as a high-resolution touch surface of the sort used in smartphones and other personal computing devices, while offering good operating efficiency. Moreover, the apparatus 40 can use high resolution for touch detection in one or more portions of a touch surface 12, while at the same time using low resolution for touch detection in one or more other portions of the touch surface 12.

Whether such refinements or extensions of the base hierarchical reading technique, the base technique in one or more embodiments can be understood as involving a top-level read that is based on logically dividing a touch surface 12, or a portion thereof, into macro rows and macro columns, such that the intersection of each macro row and macro column defines a macro region involving multiple column lines 18 and/or multiple row lines 28. Reading the touch sensor 10 at this first macro level comprises exciting each macro row with a single excitation frequency, exciting each macro column with a single excitation frequency, transforming the combined column sensing signal 56 and the combined row sensing signal 66 into frequency-domain values that include a column sensing value 60 for each macro column (i.e., each macro-column excitation frequency) and a row sensing value 68 for each macro row (i.e., each macro-row excitation frequency).

Evaluating these values allows the apparatus 40 to identify whether or which ones of the macro regions are being touched. Upon detecting a touch input to one or more of the macro regions, the apparatus performs one or more further reads that are lower-level in the read hierarchy. Each further read adds excitation frequencies, for greater resolution of the touch location(s) of the touch inputs that were initially detected at the top-level macro resolution. Ultimately, for full resolution of a touch location initially detected in one of the macro regions, the apparatus 40 uses separate excitation frequencies for each column line 18 involved with the macro region, and separate excitation frequencies for each row line 28 involved with the macro region.

Figure 11:
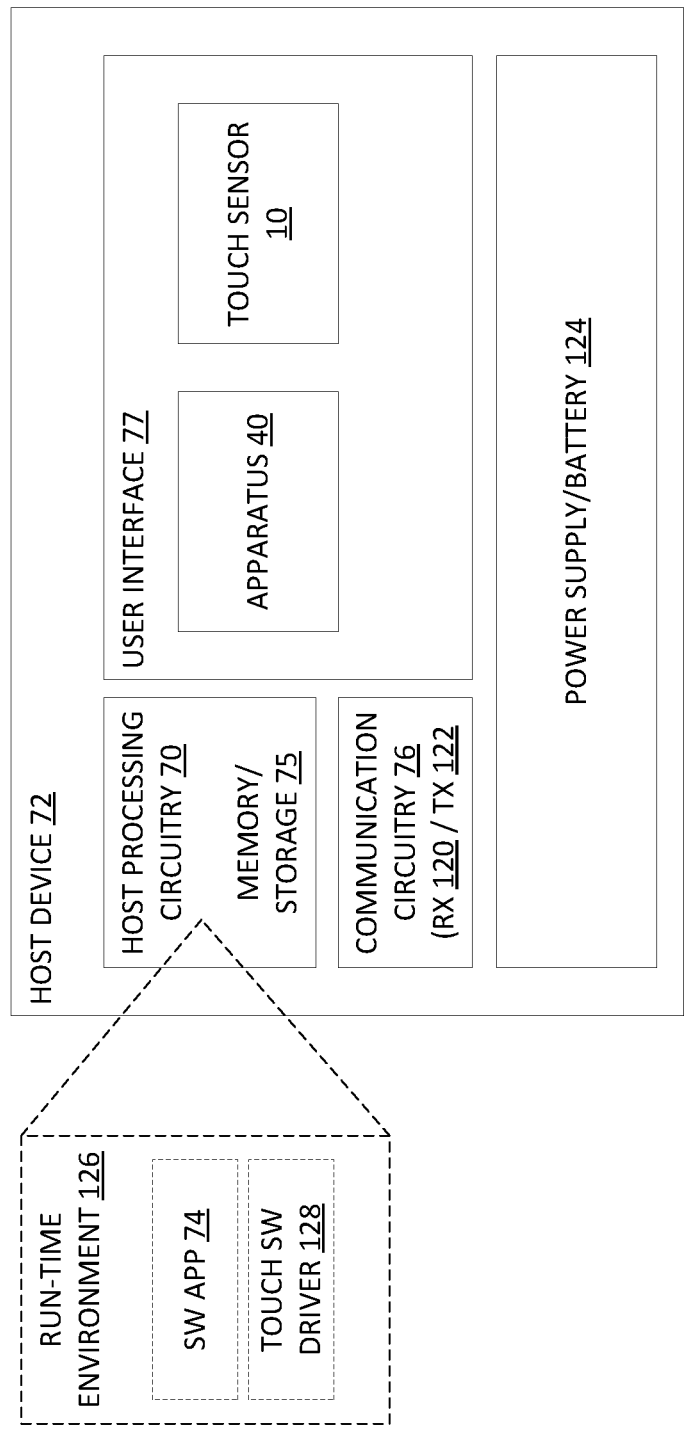
FIG. 11 is a block diagram of a host device according to an example embodiment.

Among the many advantages of the disclosed technique(s), FFT processing is faster and more efficient, particularly in the context of large or high-density touch surfaces 12. In addition, using reduced frequency resolution offers meaningful power savings, particularly if reduced excitation voltages are used for reading macro regions at reduced frequency resolution. As such, the disclosed technique(s) have broad applicability, with FIG. 11 illustrating an example host device 72, which includes host processing circuitry 70 and associated memory/storage 75, along with a user interface 77 comprising a touch sensor 10 and an implementation of the apparatus 40 for reading the touch sensor 10.

The host device 72 may also include the earlier-illustrated communication circuitry 76, which may include transceiver circuitry comprising receiver circuitry 120 and transmitter circuitry 122, for wired and/or wireless communications. Still further, the host device 72 may include a power supply/battery 124. Example host devices 72 include personal computing devices, such as tablets, touch-enabled laptops, smart phones, in-vehicle infotainment screens, kiosk systems or other point of sale or retail displays used for interaction, etc.

In operation, the host device 72 provides a run-time environment 126, e.g., based on the execution of an operating system. A software application 74 ("SW APP") executes within the run-time environment 120 and uses a touch software driver 128 ("TOUCH SW DRIVER") to interact with the touch sensor 10 via the apparatus 40. In example operation, the apparatus 40 reports touch events and corresponding touch locations, including dynamic events and changing locations, such as swipes, pinches, etc. The software application 74 provides, for example, information indicating which portions of the touch surface 12 contain touchable elements or indicating modes of operation or other information usable by the apparatus 40 in determining how to configure its reading operations.

Figure 12:
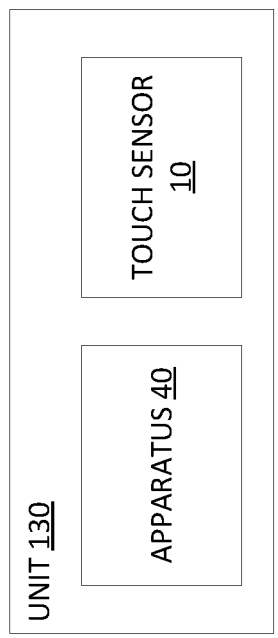
FIG. 12 is a block diagram of a unit comprising a touch sensor and an apparatus for reading the touch sensor, according to one embodiment.

FIG. 12 depicts a "unit" or assembly 130 that includes a touch sensor 10 and an implementation of the apparatus 40 configured for reading the touch sensor 10. For example, the unit 130 comprises a capacitive touch screen as the touch sensor 10 and includes an implementation of the apparatus 40 for reading the capacitive touch screen. Of course, other types or variations of touch sensor may be included in the unit 130, which may be provided for incorporation into various types of electronic systems or devices.

Figure 13:
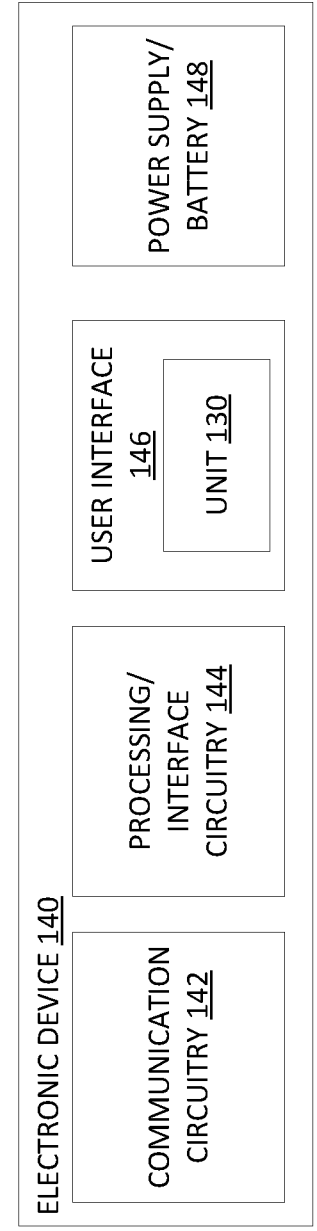
FIG. 13 is a block diagram of a mobile communication device according to one embodiment, wherein the device includes the unit of FIG. 12.

FIG. 13 illustrates one example of such incorporation, where the unit 130 forms a part of an electronic device 140. In an example embodiment, the electronic device 140 comprises a wireless communication terminal or other mobile communication device, such as a smart phone, tablet, or other computing device that includes the apparatus 40 for interfacing with a touch sensor 10. According to terminology used by the Third Generation Partnership Project (3GPP), the electronic device 140 may be a "User Equipment" or "UE".

The electronic device 140 may be understood as an example host device 72. In the illustrated embodiment, the electronic device 140 includes communication circuitry 142, processing and interface circuitry 144, a user interface 146 that includes the unit 130, and a power supply and/or battery 148. The electronic device 140 is, for example, configured for operation in a cellular network or other Wide Area Network (WAN), such as in a wireless communication network that operates according to 3GPP specifications.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of interfacing with a touch sensor having a grid of column lines and row lines for sensing touch inputs to a touch surface of the touch sensor, the method comprising:

reading the touch sensor by exciting one or more column lines with one or more column excitation frequencies to produce column sensing signals that are frequency-domain transformed, exciting one or more row lines with one or more row excitation frequencies to produce row sensing signals that are frequency-domain transformed, and evaluating transform values corresponding to the respective column and row excitation frequencies, and wherein the reading is performed hierarchically by:

reading the touch sensor at a first resolution that is less than a full resolution, based on logically subdividing all or a targeted zone of the touch surface into multiple first regions and applying excitation frequencies on a per first region basis, each first region involving multiple column lines and multiple row lines; and responsive to detecting a touch input in a particular one of the first regions, performing two or more further readings of the touch sensor to discriminate a touch location of the touch input at the full resolution, each further reading based on further subdividing the particular first region by allocating one or more additional excitation frequencies for column or row excitation within the particular first region.

2. The method of claim 1, wherein the reading is performed hierarchically according to a binary tree search, in which the first resolution is a first binary division of the touch surface into a first set of macro regions as said first regions, and, for a particular macro region in the first set of macro regions that includes the touch input, making two or more successive binary subdivisions of the particular macro region to resolve the touch input at the full resolution, each successive binary subdivision based on adding a further column or row excitation frequency.

3. The method of claim 1, wherein reading the touch sensor at the first resolution comprises using reduced-voltage excitation signals as compared to an excitation voltage associated with discriminating touch locations of touch input at the full resolution.

4. The method of claim 1, wherein discriminating the touch location of the touch input at the full resolution comprises exciting each column or row line at or bordering the touch location with a separate excitation frequency.

5. The method of claim 1, wherein a first one of the two or more further readings divides the particular first region into multiple subregions and identifies which one of the multiple subregions contains the touch location, as a touched subregion, and each further reading subdivides the touched subregion identified in the previous further reading.

6. The method of claim 1, wherein the two or more further readings comprise one further reading in which each column line involved with the particular first region is excited with a separate frequency, and wherein each row line involved with the particular first region is excited with a separate frequency.

7. The method of claim 1, wherein reading the touch sensor at the first resolution comprises applying a distinct column excitation frequency to each first region and applying a distinct row excitation frequency to each first region, such that each first region is distinguished in the frequency domain as a unique pairing of column and row excitation frequencies.

8. The method of claim 7, wherein the distinct column excitation frequencies are chosen as spaced-apart members of a defined set of excitation frequencies, and wherein at least a first one of the two or more further readings uses one or more of the adjacent members in the defined set of excitation frequencies, as the one or more additional excitation frequencies allocated for column or row excitation within the particular first region.

9. The method of claim 1, further comprising configuring a transformation algorithm used to obtain the transform values for each reading of the touch screen, in dependence on the number of distinct excitation frequencies used in the reading, and in dependence on a spacing of the distinct excitation frequencies.

10. The method of claim 1, further comprising configuring the first regions according to information provided by a software application running on a host system that includes the touch sensor.

11. The method of claim 1, further comprising performing changing the arrangement of the first regions over successive readings of the touch sensor at the first resolution.

12. The method of claim 1, further comprising using a first cycle time for reading the touch sensor at the first resolution and switching to a faster cycle time or cycle times for the two or more further readings of the touch sensor.

13. An apparatus configured for interfacing with a touch sensor having a grid of column lines and row lines for sensing touch inputs to a touch surface of the touch sensor, the apparatus comprising:

reading circuitry; and processing circuitry operative to read the touch sensor via the reading circuitry, based on exciting one or more column lines with one or more column excitation frequencies to produce column sensing signals that are frequency-domain transformed, exciting one or more row lines with one or more row excitation frequencies to produce row sensing signals, and evaluating transform values corresponding to the respective column and row excitation frequencies, and wherein the reading is performed hierarchically based on the processing circuitry being configured to:

read the touch sensor at a first resolution that is less than a full resolution, based on logically subdividing all or a targeted zone of the touch surface into multiple first regions and applying excitation frequencies on a per first region basis, each first region involving multiple column lines and multiple row lines; and responsive to detecting a touch input in a particular one of the first regions, perform two or more further readings of the touch sensor to discriminate a touch location of the touch input at the full resolution, each further reading based on further subdividing the particular first region by allocating one or more additional excitation frequencies for column or row excitation within the particular first region.

14. The apparatus of claim 13, wherein the reading is performed hierarchically according to a binary tree search, in which the first resolution is a first binary division of the touch surface into a first set of macro regions as said first regions, and, for a particular macro region in the first set of macro regions that includes the touch input, making two or more successive binary subdivisions of the particular macro region to resolve the touch input at the full resolution, each successive binary subdivision based on adding a further column or row excitation frequency.

15. The apparatus of claim 13, wherein, to read the touch sensor at the first resolution, the processing circuitry is configured to use reduced-voltage excitation signals as compared to an excitation voltage used for discriminating touch locations of touch input at the full resolution.

16. The apparatus of claim 13, wherein, to discriminate the touch location of the touch input at the full resolution, the processing circuitry is configured to excite each column or row line at or bordering the touch location with a separate excitation frequency.

17. The apparatus of claim 13, wherein a first one of the two or more further readings divides the particular first region into multiple subregions and identifies which one of the multiple subregions contains the touch location, as a touched subregion, and each further reading subdivides the touched subregion identified in the previous further reading.

18. The apparatus of claim 13, wherein the two or more further readings comprise one further reading in which each column line involved with the particular first region is excited with a separate frequency, and wherein each row line involved with the particular first region is excited with a separate frequency.

19. The apparatus of claim 13, wherein, to read the touch sensor at the first resolution, the processing circuitry is configured to apply a distinct column excitation frequency to each first region and apply a distinct row excitation frequency to each first region, such that each first region is distinguished in the frequency domain as a unique pairing of column and row excitation frequencies.

20. The apparatus of claim 19, wherein the distinct column excitation frequencies are chosen as spaced-apart members of a defined set of excitation frequencies, and wherein at least a first one of the two or more further readings uses one or more of the adjacent members in the defined set of excitation frequencies, as the one or more additional excitation frequencies allocated for column or row excitation within the particular first region.

21. The apparatus of claim 13, wherein the processing circuitry is configured to configure a transformation algorithm used to obtain the transform values for each reading of the touch screen, in dependence on the number of distinct excitation frequencies used in the reading, and in dependence on a spacing of the distinct excitation frequencies.

22. The apparatus of claim 13, wherein the processing circuitry is configured to configure the first regions according to information provided by a software application running on a host system that includes the touch sensor.

23. The apparatus of claim 13, wherein the processing circuitry is configured to change the arrangement of the first regions over successive readings of the touch sensor at the first resolution.

24. The apparatus of claim 13, wherein the processing circuitry is configured to use a first cycle time for reading the touch sensor at the first resolution and switch to a faster cycle time or cycle times for the two or more further readings of the touch sensor.

25. An electronic device, the electronic device comprising:

a touch sensor having a grid of column lines and row lines for sensing touch inputs to a touch surface of the touch sensor;

host processing circuitry configured for execution of one or more software applications that use the touch sensor as a control input; and an apparatus configured to interface the host processing circuitry with the touch sensor, the apparatus comprising:

reading circuitry; and processing circuitry operative to read the touch sensor via the reading circuitry, based on exciting one or more column lines and one or more row lines with respective column and row excitation frequencies, to produce respective column and row sensing signals that are frequency-domain transformed, and evaluating transform values corresponding to the respective column and row excitation frequencies, and wherein the reading is performed hierarchically based on the processing circuitry being configured to:

read the touch sensor at a first resolution that is less than a full resolution, based on logically subdividing all or a targeted zone of the touch surface into multiple first regions and applying respective column and row excitation frequencies on a per first region basis, each first region involving multiple column lines and row lines; and responsive to detecting a touch input in a particular one of the first regions, perform two or more further readings of the touch sensor to discriminate a touch location of the touch input at the full resolution, each further reading based on further subdividing the particular first region by allocating one or more additional excitation frequencies for column or row excitation within the particular first region.

\* \* \* \* \*